US012057253B2

(12) United States Patent
Jung et al.

(10) Patent No.: US 12,057,253 B2
(45) Date of Patent: Aug. 6, 2024

(54) COIL COMPONENT

(71) Applicant: SAMSUNG ELECTRO-MECHANICS CO., LTD., Suwon-si (KR)

(72) Inventors: Do Young Jung, Suwon-si (KR); Kang Wook Bong, Suwon-si (KR); Jin Won Lee, Suwon-si (KR); Jae Youn Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 719 days.

(21) Appl. No.: 17/184,944

(22) Filed: Feb. 25, 2021

(65) Prior Publication Data

US 2022/0172878 A1 Jun. 2, 2022

(30) Foreign Application Priority Data

Dec. 2, 2020 (KR) ........................ 10-2020-0166988

(51) Int. Cl.
*H01F 27/28* (2006.01)
*H01F 27/32* (2006.01)
(Continued)

(52) U.S. Cl.
CPC ....... *H01F 27/2804* (2013.01); *H01F 27/323* (2013.01); *H01F 41/0233* (2013.01);
(Continued)

(58) Field of Classification Search
CPC ............... H01F 27/2804; H01F 27/323; H01F 2027/2809; H01F 5/04; H01F 27/292; H01F 17/0006; H01F 27/324; H01F 2017/048
(Continued)

(56) References Cited

U.S. PATENT DOCUMENTS

2015/0170823 A1* 6/2015 Jeong ..................... C25D 7/001 336/200
2016/0343500 A1* 11/2016 Jung ..................... H01F 41/042
(Continued)

FOREIGN PATENT DOCUMENTS

| | | | |
|---|---|---|---|
| KR | 10-2018-0063575 | A | 6/2018 |
| KR | 10-2019-0004914 | A | 1/2019 |
| KR | 10-2019-0106243 | A | 9/2019 |

OTHER PUBLICATIONS

"Samsung Electro-Mechanics develops world's smallest power inductor," Sep. 14, 2020, (https://m.samsungsem.com/global/newsroom/news/view.do?id=1621).

*Primary Examiner* — Shawki S Ismail
*Assistant Examiner* — Kazi S Hossain
(74) *Attorney, Agent, or Firm* — Morgan, Lewis & Bockius LLP

(57) ABSTRACT

A coil component includes a body, a support portion disposed in the body, a coil portion disposed on a first surface of the support portion, a lead portion disposed on a second surface of the support portion facing the first surface of the support portion and connected to the coil portion, and a via penetrating through the support portion to connect an inner end portion of the coil portion and an inner end portion of the lead portion to each other, wherein the coil portion includes a first conductive layer embedded in the support portion and having a first surface exposed to or facing the first surface of the support portion, a second conductive layer disposed on the first surface of the first conductive layer, and a third conductive layer disposed on the second conductive layer and protruding from the first surface of the support portion.

28 Claims, 28 Drawing Sheets

A

(51) Int. Cl.
*H01F 41/02* (2006.01)
*H01F 41/04* (2006.01)
*H01F 41/12* (2006.01)

(52) U.S. Cl.
CPC ......... *H01F 41/041* (2013.01); *H01F 41/122* (2013.01); *H01F 2027/2809* (2013.01)

(58) Field of Classification Search
USPC ......................................... 336/200, 232, 192
See application file for complete search history.

(56) References Cited

U.S. PATENT DOCUMENTS

| | | | | |
|---|---|---|---|---|
| 2018/0158584 | A1 | 6/2018 | Park et al. | |
| 2019/0013141 | A1 | 1/2019 | Yoon et al. | |
| 2019/0103215 | A1* | 4/2019 | Jung | H01F 17/0006 |
| 2019/0198223 | A1* | 6/2019 | Kim | H01F 17/04 |
| 2019/0279807 | A1 | 9/2019 | Ryu | |
| 2019/0362886 | A1* | 11/2019 | Bong | H01F 27/2804 |

* cited by examiner

COIL COMPONENT

CROSS-REFERENCE TO RELATED APPLICATION(S)

The present application claims the benefit of priority to Korean Patent Application No. 10-2020-0166988, filed on Dec. 2, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher levels of performance and become smaller, the number of electronic components used in electronic devices has increased while being miniaturized.

In the case of a thin-film type coil component according to the related art, planar spiral coil patterns are respectively formed on both surfaces of a support portion. The coil patterns, respectively formed on both surfaces of the support portion, are connected to each other by a via penetrating through the support portion.

SUMMARY

An aspect of the present disclosure is to provide a coil component which may be thinned.

According to an aspect of the present disclosure, a coil component includes a body, a support portion disposed in the body, a coil portion having at least one turn disposed on a first surface of the support portion, a lead portion disposed on a second surface of the support portion facing the first surface of the support portion and connected to the coil portion, and a via penetrating through the support portion to connect an inner end portion of the coil portion and an inner end portion of the lead portion to each other. The coil portion includes a first conductive layer embedded in the support portion and having a first surface exposed to or facing the first surface of the support portion, a second conductive layer disposed on the first surface of the first conductive layer, and a third conductive layer disposed on the second conductive layer and protruding from the first surface of the support portion.

According to another aspect of the present disclosure, a coil component includes a body; a support portion disposed in the body; a coil portion having at least one turn disposed on a first surface of the support portion; a lead portion disposed on a second surface of the support portion facing the first surface of the support portion and connected to the coil portion; and a via penetrating through the support portion to connect an inner end portion of the coil portion and an inner end portion of the lead portion to each other. The coil portion includes a first conductive layer embedded in the support portion, a second conductive layer disposed on the first conductive layer, and a third conductive layer disposed on the second conductive layer, and the second conductive layer includes a metal different from a metal of at least one of the first conductive layer or the third conductive layer.

According to still another aspect of the present disclosure, a coil component includes a body; a support portion disposed in the body; a coil portion having at least one turn disposed on a first surface of the support portion and winding around a core of the body penetrating the coil portion and the support portion, the coil portion including an external end portion extending to be exposed to a first end surface of the body; and a lead portion disposed on a second surface of the support portion facing the first surface of the support portion, connected to the coil portion by a via penetrating through the support portion, and extending to be exposed to a second end surface of the body opposing the first end surface of the body. The first surface of the support portion has a groove, the coil portion includes a first conductive layer disposed on the groove of the support portion, a second conductive layer disposed on the first conductive layer, and a third conductive layer disposed on the second conductive layer, and an entire space below a first region of the support portion is free of the lead portion and the lead portion is disposed on a second region of the support portion, where the first region of the support portion is located between the core and the first end surface of the body and the second region of the support portion is located between the core and the second end surface of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
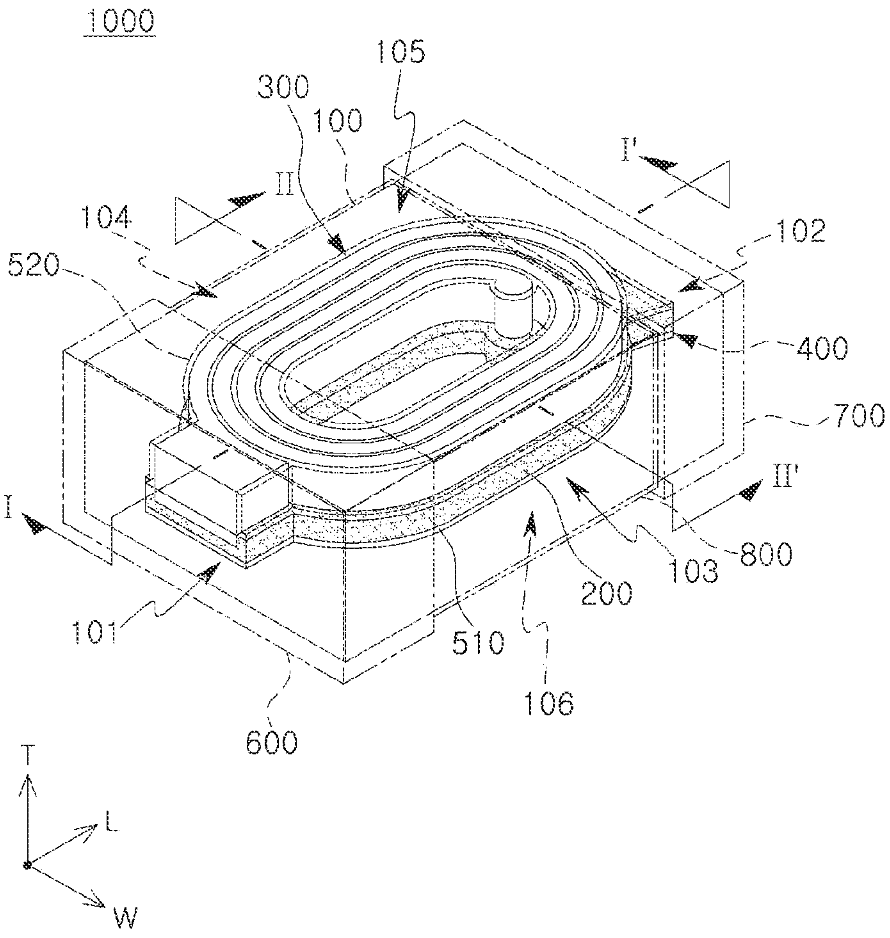
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
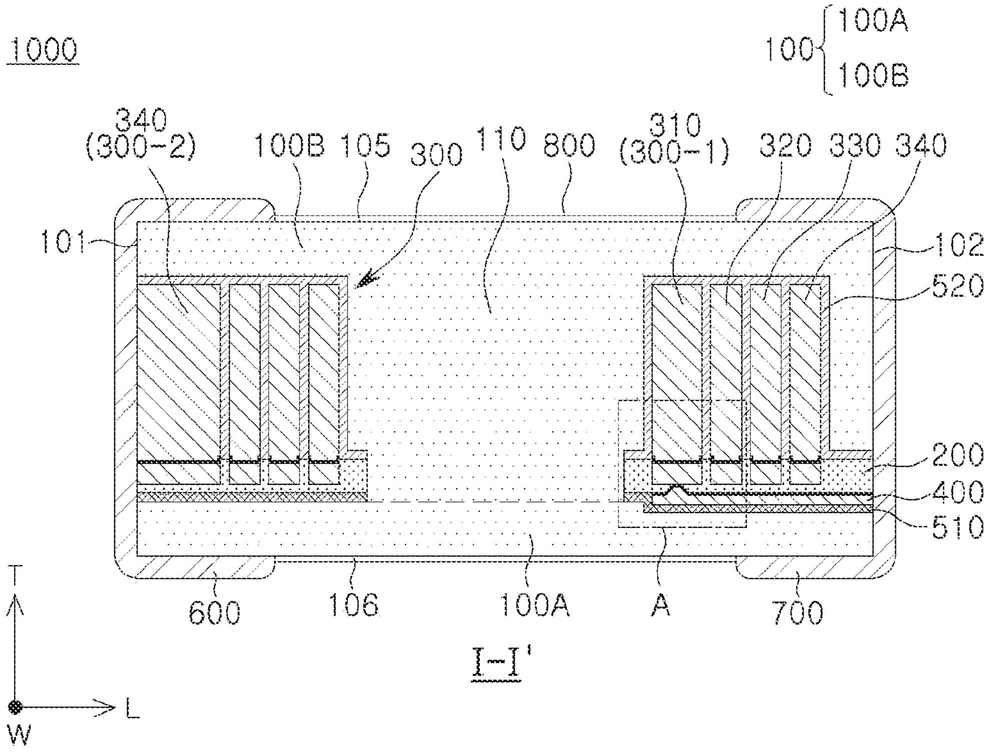
FIG. 2 is a cross-sectional view taken along line I-I' of FIG. 1.
Figure 3:
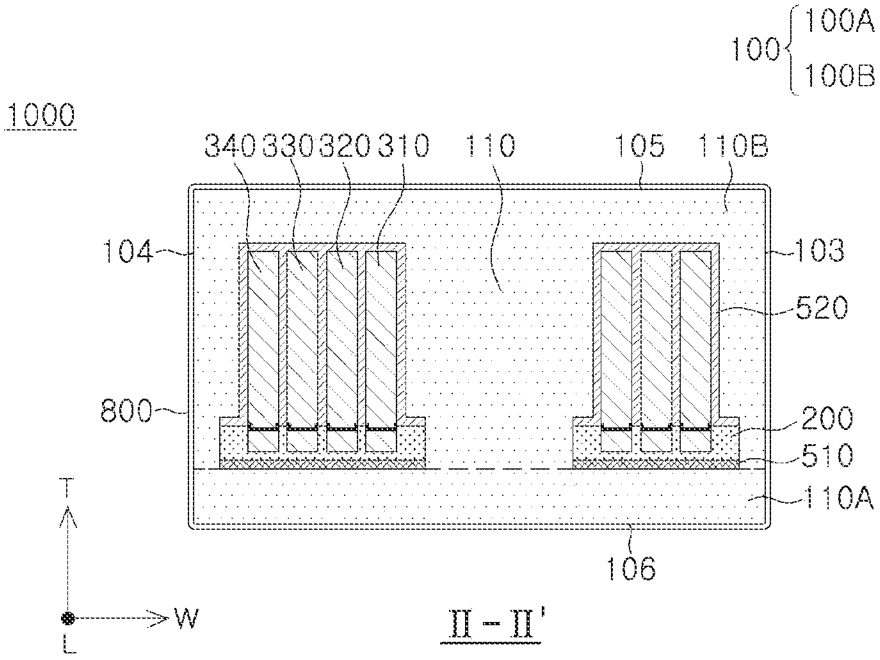
FIG. 3 is a cross-sectional view taken along line II-II' of FIG. 1.
Figure 4:
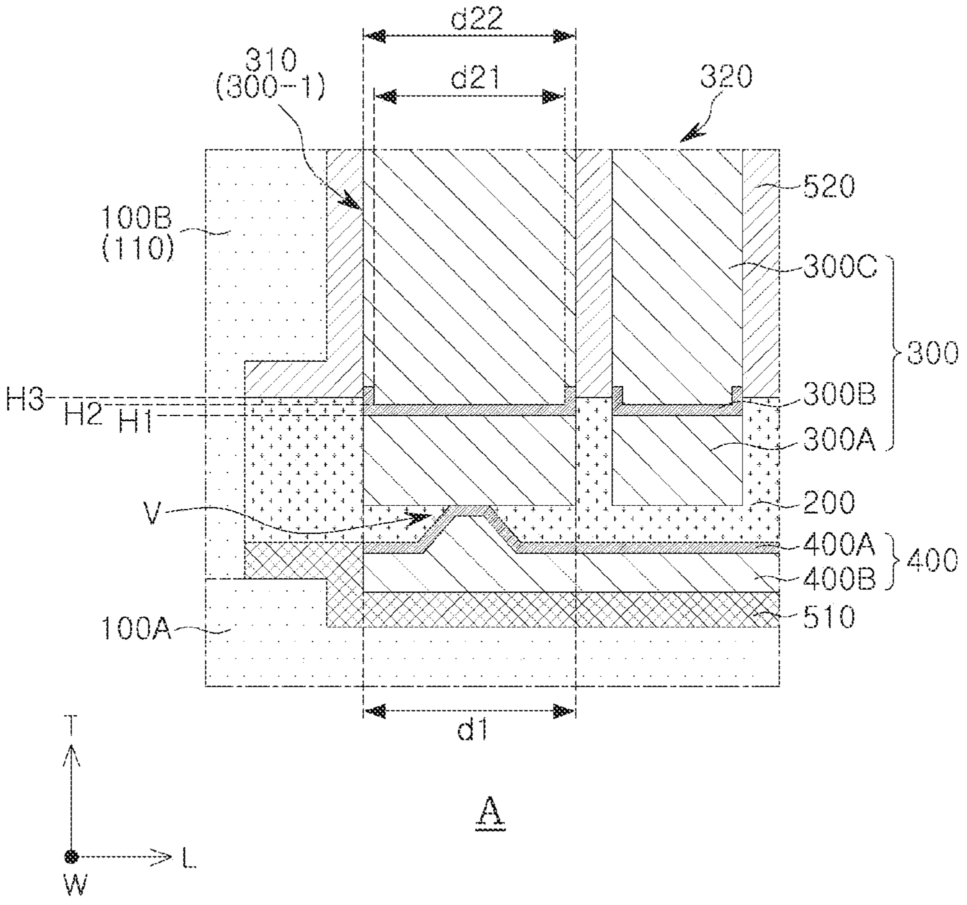
FIG. 4 is an enlarged view of portion 'A' of FIG. 2.

FIG. 1 is a schematic perspective view of a coil component according to an exemplary embodiment. FIG. 2 is a cross-sectional view taken along line I-I' of FIG. 1, and FIG. 3 is a cross-sectional view taken along line II-II' of FIG. 1. FIG. 4 is an enlarged view of portion 'A' of FIG. 2.

Referring to FIGS. 1 to 4, a coil component 1000 according to the first exemplary embodiment may include a body 100, a support portion 200, a coil portion 300, a lead portion 400, and a first insulating layer 510, a second insulating layer 520, and first and second external electrodes 600 and 700.

The body 100 may form an exterior of the coil component 1000 according to the present embodiment. The support portion 200, the coil portion 300, the lead portion 400, the first insulating layer 510, and the second insulating layer 520 to be described later may be disposed in the body 100.

The body 100 may be formed to have a hexahedral shape in overall.

Based on directions of FIGS. 1 to 3, the body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces (a first end surface and a second end surface) of the body 100 may refer to the first surface 101 and the second surface 102 of the body 100, respectively, both side surfaces (a first side surface and a second side surface) of the body 100 may refer to the third surface 103 and the fourth surface 104, respectively. In addition, a first surface and a second surface of the body 100 may refer to the sixth surface 106 and the fifth surface 105 of the body 100, respectively. Since the coil component 1000 according to the present embodiment is mounted on a mounting board such as a printed circuit board (PCB), the sixth surface 106 of the body 100 may be mounted such that the sixth surface 106 faces an upper surface of the mounting board.

As an example, the coil component 1000 according to the present embodiment in which the external electrodes 600 and 700 and a surface insulating layer 800 to be described later are formed, may be formed to have a length of 2.5 mm, a width of 2.0 mm, and a thickness of 1.0 mm, a length of 1.6 mm, a width of 0.8 mm, and a thickness of 0.8 mm, a length of 1.0 mm, a width of 0.5 mm, and a thickness of 0.5 mm, or a length of 0.8 mm, a width of 0.4 mm, and a thickness of 0.65 mm, but the present disclosure is not limited thereto. Since the above-described numerical values are only design values that do not reflect process errors and the like, it should be considered that they fall within the scope of the present disclosure, to the extent that they are recognized as process errors.

The length of the coil component 1000 may refer to a maximum value, among lengths of a plurality of segments, connecting two outermost boundary lines opposing each other in a length (L) direction of the coil component 1000 and parallel to the length (L) direction of the coil component 1000, based on an optical microscope or scanning electron microscope (SEM) image of a cross section of the coil component 1000 in a length-thickness (L-T) direction in a central portion of the coil component 1000 in a width (W) direction. Alternatively, the length of the coil component 1000 may refer to a minimum value, among lengths of a plurality of segments connecting two outermost boundary lines opposing each other in the length (L) direction of the coil component 1000 illustrated in the cross-sectional image and parallel to the length (L) direction of the coil component 1000. Alternatively, the length of the coil component 1000 may refer to an arithmetic mean of at least two segments, among a plurality of segments connecting two outermost boundary lines opposing each other in the length (L) direction of the coil component 1000, illustrated in the cross-sectional image, and parallel to the length (L) direction of the coil component 1000.

The thickness of the coil component 1000 may refer to a maximum value, among lengths of a plurality of segments, connecting two outermost boundary lines opposing each other in a thickness (T) direction of the coil component 1000 and parallel to the thickness (T) direction of the coil component 1000, based on an optical microscope or scanning electron microscope (SEM) image of a cross section of the coil component 1000 in a length-thickness (L-T) direction in a central portion of the body 100 in a width (W) direction. Alternatively, the thickness of the coil component 1000 may refer to a minimum value, among lengths of a plurality of segments connecting two outermost boundary lines opposing each other in a thickness (T) direction of the coil component 1000 illustrated in the cross-sectional image and parallel to the thickness (T) direction of the coil component 1000. Alternatively, the thickness of the coil component 1000 may refer to an arithmetic mean of at least two segments, among a plurality of segments connecting two outermost boundary lines opposing each other in a thickness (T) direction of the coil component 1000, illustrated in the cross-sectional image, and parallel to the thickness (T) direction of the coil component 1000.

The width of the coil component 1000 may refer to a maximum value, among lengths of a plurality of segments, connecting two outermost boundary lines opposing each other in a width (W) direction of the coil component 1000 and parallel to the width (W) direction of the coil component 1000, based on an optical microscope or scanning electron microscope (SEM) image of a cross section of the coil component 1000 in a length-thickness (L-T) direction in a central portion of the body 100 in a width (W) direction. Alternatively, the width of the coil component 1000 may refer to a minimum value, among lengths of a plurality of segments connecting two outermost boundary lines opposing each other in a width (W) direction of the coil component 1000 illustrated in the cross-sectional image and parallel to the width (W) direction of the coil component 1000. Alternatively, the length of the coil component 1000 may refer to an arithmetic mean of at least two segments, among a plurality of segments connecting two outermost boundary lines opposing each other in a width (W) direction of the coil component 1000, illustrated in the cross-sectional image, and parallel to the width (W) direction of the coil component 1000.

Each of the length, the width, and the thickness of the coil component 1000 may be measured by a micrometer measurement method. In the micrometer measurement method, measurement may be performed by setting a zero point using a micrometer (instrument) with gage repeatability and reproducibility (R&R), inserting the coil component 1000 between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

The body 100 may include a magnetic material and a resin. Specifically, the body 100 may be formed by laminating at least one magnetic composite sheet in which a magnetic material is dispersed in a resin. However, the body 100 may have a structure, other than the structure in which a magnetic material is dispersed in a resin. For example, the body 100 may include a magnetic material such as ferrite.

The magnetic material of the body 100 may be ferrite or magnetic metal powder particles.

For example, the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particles may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particles may be amorphous or crystalline. For example, the magnetic metal powder particles may be a Fe—Si—B—Cr-based amorphous alloy powder, but is not limited thereto.

Each of the magnetic metal powder particles 10 may have an average diameter of about 0.1 μm to 30 μm, but is not limited thereto.

The body 100 may include two or more types of magnetic metal powder particles dispersed in a resin. The term "different types of magnetic powder particles" means that the magnetic powder particles, dispersed in the resin, are distinguished from each other by at least one of average diameter, composition, crystallinity, and shape.

The resin may include epoxy, polyimide, liquid crystal polymer, or the like, in a single form or combined forms, but is not limited thereto.

The body 100 may include a core 110 penetrating through a central portion of each of the support substrate 200 and the coil portion 300 to be described later. The core 110 may be formed by filling the central portion of each of the coil portion 300 and the support substrate 200 with a magnetic composite sheet, but the present disclosure is not limited thereto.

The body 100 may includes a first region 100A, disposed on a first insulating layer 510 to be described later, and a second region 100B disposed on a second insulating layer 520 to be described later to include the core 110. The first region 100A of the body 100 may serves as a base for a process of forming a second conductive layer and a subsequent process (see FIGS. 13J to 13P), together with the support portion 200 to be described later. The first and second regions 100A and 100B of the body 100 may be formed in different processes, such that a boundary therebetween may be formed in a portion in which they are connected to each other. As the first and second regions 100A and 100B of the body 100 are coupled to each other, the body 100 may form an overall exterior of the coil component 1000 according to the present embodiment.

The support 200 may be disposed in the body 100. The coil portion 300, the lead portion 400, and the insulating layers 510 and 520 to be described later may be disposed on the support portion 200. The support portion 200 is configured to secure electrical insulation between the coil portion 300 and the lead portion 400. In addition, the support portion 200 may serve as a base for a process of forming a second conductive layer and subsequent processes (see FIGS. 13J to 13P) to be described later, together with the first region 100A of the body 100.

The support portion 200 may include an insulating material, for example, a thermosetting insulating resin such as an epoxy resin, a thermoplastic insulating resin such as polyimide, or a photosensitive insulating resin, or the support portion 200 may include an insulating material in which a reinforcing material such as a glass fiber or an inorganic filler is impregnated with an insulating resin. For example, the support portion 200 may include an insulating material such as Ajinomoto Build-up Film (ABF), a photoimageable dielectric (PID) film, FR-4, a bismaleimide triazine (BT) resin, prepreg, and the like, but the present disclosure is not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support portion 200 may include an insulating material including a reinforcing material, the support substrate 200 may provide more improved rigidity. When the support portion 200 includes an insulating material including no glass fiber, the support substrate 200 is advantageous for thinning the entire coil portion 300.

The support portion 200 may have a thickness of 10 μm or more to 100 μm or less. When the support portion 200 has a thickness of less than 10 μm, it may be difficult to secure electrical insulation between the coil portion 300 and the lead portion 400. When the support portion 200 has a thickness greater than 100 μm, it may be disadvantageous for thinning of a component. As an example, as illustrated in FIGS. 2 to 4, the thickness of the support portion 200 may refer to a dimension from one region, in contact with the first insulating layer, of a lower surface of the support portion to one region, in contact with the second insulating layer 520, of an upper surface of the support portion 200 in a thickness direction. The term "dimension" may refer to one value measured once in the same region, or an arithmetic average of a plurality of values measured two or more in the same region. Alternatively, the term "dimension" may refer to an arithmetic average of a plurality of values, respectively measured once in a plurality of regions, or an arithmetic average of a plurality of values, respectively measured twice or more in a plurality of regions. As an example, the thickness of the support portion 200 may be appropriately changed within the condition in which a shortest distance (an insulation distance) from a lower surface of the first conductive layer 300A to be described (based on the direction of FIG. 4) to a lower surface of the support portion 200 is 5 μm or more, based on the direction of FIGS. 2 and 4. When the insulation distance is less than 5 μm, it may be difficult to prevent short-circuit between the coil portion 300 and the lead portion 400.

The support portion 200 may have a shape corresponding to a shape of a region formed when the coil portion 300 and the lead portion 400 are projected in the thickness direction T of the body 100. Such a shape of the support portion 200 may cause an effective volume of a magnetic material to be increased, as compared with a size of the same component. As an example, such a shape of the support portion 200 may be obtained by forming a coil portion 300, a lead portion 400, and first and second insulating layers 510 and 520 to be described later on a first surface and a second surface of the support portion 200 facing each other, and then performing a process to remove at least a portion of each of the support portion 200 and the first and second insulating layers 510 and 520 in a direction, perpendicular to the first surface of the support portion 200 (the thickness direction T in FIGS. 1 and 4). For the above reason, the first and second insulating layers 510 and 520 may not cover all side surfaces of the support portion 200 having two surfaces exposed to the first and second surfaces 101 and 102 of the body 100. For example, when the support portion 200 and each of the first and second insulating layers 510 and 520 are projected in the thickness direction T of the body 100, projected shapes and areas of the support portion 200 and each of the first and second insulating layers 510 and 520 may be substantially the same.

The coil portion 300 may have at least one turn disposed on the first surface of the support portion 200. The coil portion 300 may disposed inside the body 100 to express characteristics of a coil component. For example, when the coil component 1000 according to the present embodiment is used as a power inductor, the coil portion 300 may serve to store an electric field as a magnetic field to maintain an output voltage, allowing power of an electronic device to be stabilized.

The coil portion 300 may have a planar spiral shape in which at least one turn is formed about the core 110. For example, the coil portion 300 may be wound once about the core 110 from an inner end portion 300-1, exposed adjacent to the core 110 on the first surface of the support portion 200, to an external end portion 300-2 exposed to the first surface 101 of the body 100. As an example, in the case of the present embodiment, the coil portion 300 may include a first turn 310 adjacent to the core 110, a second turn 320 disposed outside the first turn 310, a third turn 330 disposed outside the second turn 320, and a fourth turn 340 disposed outside the 330 between the inner end portion 300-1 and the external end portion 300-2. In the case of the present embodiment, as illustrated in FIG. 1, the fourth turn 340 may form 0.5 turn, and thus, the coil portion 300 may be formed to have a total of 3.5 turns, but the scope of the present disclosure is limited thereto.

The inner end portion 300-1 of the coil portion 300 may be connected to an inner end portion of the lead portion 400 to be described later by a via V penetrating through the support portion 200 to be described later. The external end portion 300-2 of the coil portion 300 may be exposed to the first surface 101 of the body 100 to be in contact with the first external electrode 600, to be described later, disposed on the second surface 102 of the body 100. As will be described later, the external end portion of the lead portion 400 may be exposed to the second surface 102 of the body 100 to be in contact with the second external electrode 700, to be described later, disposed on the second surface 102 of the body 100. As a result, the coil portion 300 may overall serve as a single coil connected to the first and second external electrodes 600 and 700 in series, together with the lead portion 400 and the via V.

In the case of a typical thin-film coil component, a coil portion may include a coil-shaped pattern formed on each of both surfaces of a support substrate. Meanwhile, in the case of the present embodiment, the coil portion 300 may only be formed on the upper surface side of the support portion 200, based on the directions of FIGS. 1 to 4.

The coil portion 300 may include a first conductive layer 300A, embedded in the support portion 200 and having a first surface exposed to or facing the first surface of the support portion 200, a second conductive layer 300B disposed on one surface of the first conductive layer 300A, and a third conductive layer 300C disposed on the second conductive layer 300B to protrude from the first surface of the support portion 200. The one surface of the first conductive layer 300A may be disposed on a level lower than a level of the support portion 200, and the second conductive layer 300B may be in contact with the one surface of the first conductive layer 300A and may have at least a portion disposed on a level lower than a level of the first surface of the support portion 200. The third conductive layer 300C may include a first region, disposed on a level lower than a level of the first surface of the support portion 200, and a second region disposed on a level higher than the first surface of the support portion 200 and having a line width d22 greater than a line width d21 of the first region. According to one exemplary embodiment, a maximum line width of the second conductive layer 300B may be substantially the same as a line width d1 of the first conductive layer 300A.

Specifically, referring to FIGS. 2 to 4, the first conductive layer 300A may be embedded in an upper surface of the support portion 200, such that that an upper surface of the first conductive layer 300A is exposed to or facing the upper surface of the support portion 200, based on the directions of FIGS. 2 to 4. A groove may be formed on the upper surface of the first conductive layer 300A, such that a level h1 of the upper surface of the first conductive layer 300A may be lower than a level h3 of the upper surface of the support portion 200. The second conductive layer 300B may be disposed on an internal wall of the groove, formed in the upper surface of the first conductive layer 300A, and the upper surface of the first conductive layer 300A, such that a level h2 of at least a portion of the second conductive layer 300B may be lower than a level h3 of the upper surface of the support portion 200. The third conductive layer 300C may be disposed on the second conductive layer 300B, and may fill the remainder of the groove, formed on the upper surface of the first conductive layer 300A, except for a region, in which the second conductive layer 300B is disposed, of the groove. For example, since the second conductive layer 300B is formed to have a conformal shape having a thickness smaller than a depth of the groove, a portion of a region, in contact with the second conductive layer 300B, of the third conductive layer 300A may fill the remainder of the groove, formed on the upper surface of the first conductive layer 300A, to be coplanar with the upper surface of the support portion 200, and the other portion of the third conductive layer 300C may protrude from the upper surface of the support portion 200. The line width d21 of the first region, filling the remainder of the groove, of the third conductive layer 300C may be greater than the line width d22 of the second region disposed on the first region of the third conductive layer 300C. The line width d22 of the second region of the third conductive layer 300C may be substantially the same as the line width d1 of the first conductive layer 300A. A portion of the second conductive layer 300B may protrude from the upper surface of the support portion 200 by a length substantially equal to a thickness of the second conductive layer 300B. At least a portion of a side surface of a region, protruding from the upper surface of the support portion 200, of the second conductive layers 300B may not be covered with the third conductive layer 300C, and thus, may be in contact with a second insulating layer 520 covering the coil portion 300 to be described later.

The thickness of the second conductive layer 300B may refer to a dimension of a region, disposed on the upper surface of the first conductive layer 300A, of the second conductive layer 300B in a thickness direction T, based on FIG. 2. A depth of the groove, formed on the upper surface of the first conductive layer 300A, may be a dimension from an imaginary segment, formed when connecting the upper surface of the support portion 200, to the upper surface of the first conductive layer 300A in the thickness direction T. The line widths d1, d21, and d22 of each of the first and third conductive layers 300A and 300C may refer to dimensions of the first and third conductive layers 300A and 300C in the length direction L, based on a cross section in the length direction L-the thickness direction L (an L-T cross section), as illustrated in FIGS. 2 and 4. Each of the dimensions may refer to may refer to one value measured once in the same region, or an arithmetic average of a plurality of values measured two or more in the same region. Alternatively, each of the dimensions may refer to an arithmetic average of a plurality of values, respectively measured once in a plurality of regions, or an arithmetic average of a plurality of values, respectively measured twice or more in a plurality of regions.

The first conductive layer 300A may be formed by forming a plating resist on a first surface of a support member (10 in FIG. 13A) and filling an opening of the plating resist with a conductive material using an ultrathin metal layer (3 in FIG. 13A) of the support member (10 in FIG. 13A) as a seed layer. After the plating resist is removed, the support portion 200 is formed on the first surface of the support member (see FIG. 13C) and the support member is then removed (see FIG. 13I). As a result, the first conductive layer 300A may be embedded in the support portion 200 to expose one surface of the first conductive layer 300A to the first surface of the support portion 200. In the process of removing the support member (see FIG. 13I), the support member may be removed while the ultrathin metal layer is attached to the first surface of the support portion 200. The ultrathin metal layer, attached to the first surface of the support portion 200, may be removed by chemical etching. In this case, when the ultrathin metal layer and the first conductive layer 300A include the same metal, at least a portion of the first conductive layer 300A may also be removed during removal of the ultrathin metal layer to form a groove in the one surface of the first conductive layer 300A exposed to the first surface of the support portion 200, but the scope of the present disclosure is not limited thereto. In the case of the present embodiment, since both the ultrathin metal layer and the first conductive layer 300A include copper (Cu), a groove may be formed in the upper surface of the first conductive layer 300A, based on the directions of FIGS. 2 to 4, as described above. The thickness of the first conductive layer 300A may be appropriately changed within the range smaller than the thickness of the support portion 200 described above. As an example, the thickness of the first conductive layer 300A may be 5 μm or more to 90 μm or less, but the present disclosure is not limited thereto.

The second conductive layer 300B may be a seed layer for forming the third conductive layer 300C by plating. The second conductive layer 300B may include, for example, at least one of molybdenum (Mo), nickel (Ni), titanium (Ti), chromium (Cr), and copper (Cu). In the present embodiment, the second conductive layer 300B is formed by vapor deposition such as sputtering, and may include molybdenum (Mo), but the scope of the present disclosure is not limited thereto. The second conductive layer 300B may have a thickness of 100 nm or more to 500 nm or less. When the second conductive layer 300B has a thickness of less than 100 nm, it may be difficult to uniformly form the second conductive layer 300B. As a result, it may be difficult to form the third conductive layer 300C by electroplating. When the second conductive layer 300B has a thickness greater than 500 nm, it may be uneconomical.

The third conductive layer 300C may be formed by electroplating using the second conductive layer 300B as a seed layer. The third conductive layer 300C may include, for example, at least one of molybdenum (Mo), nickel (Ni), titanium (Ti), chromium (Cr), and copper (Cu). The third conductive layer 300C may have a thickness of, for example, 100 μm or more to 200 μm or less, but the present disclosure is not limited thereto.

Figure 13A:
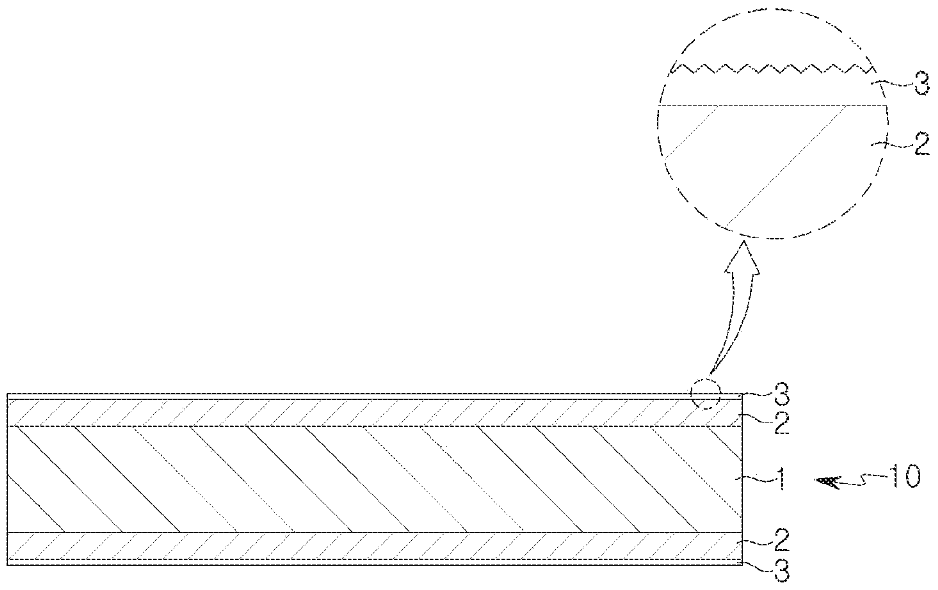
FIGS. 13A to 13P are process flow diagrams illustrating an example of a method of manufacturing the coil component according to the first exemplary embodiment of the present disclosure.
Figure 13B:
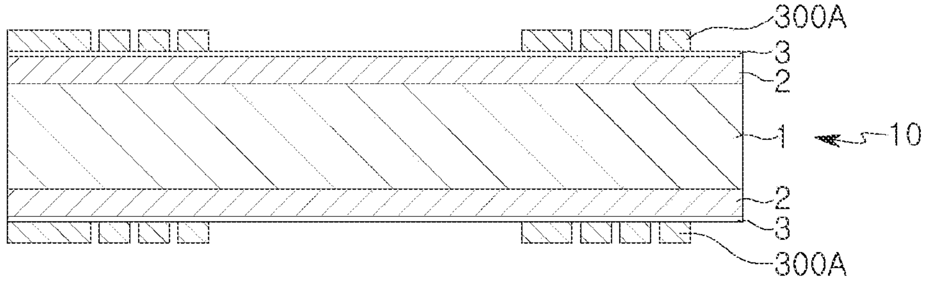
Figure 13C:
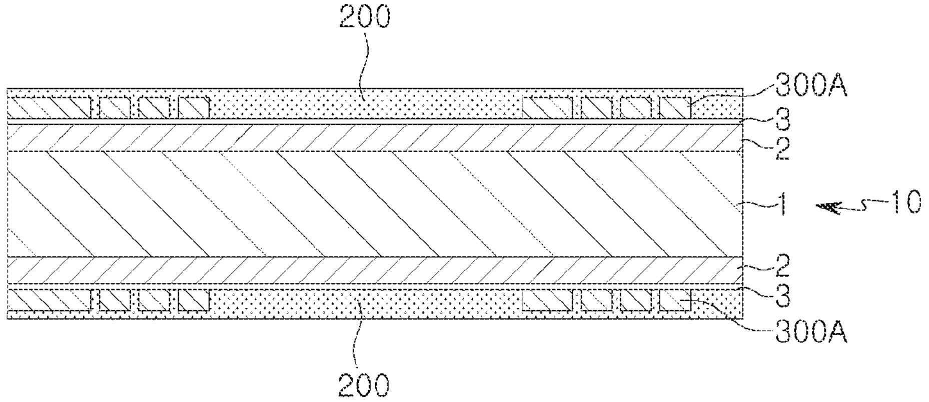
Figure 13D:
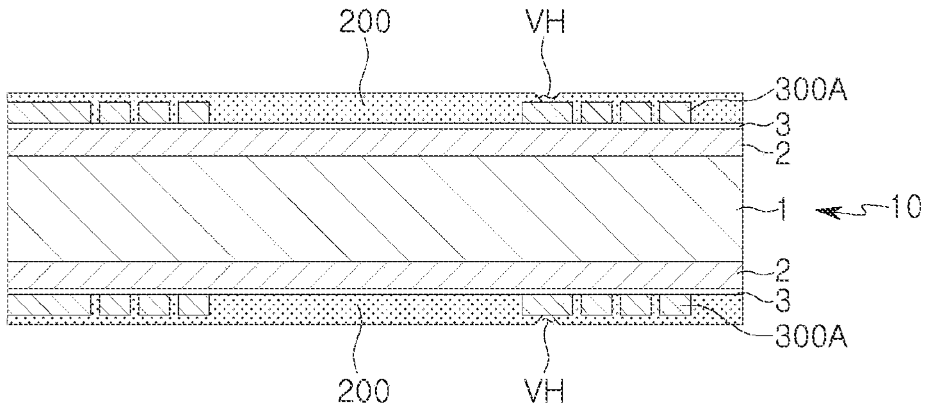
Figure 13E:
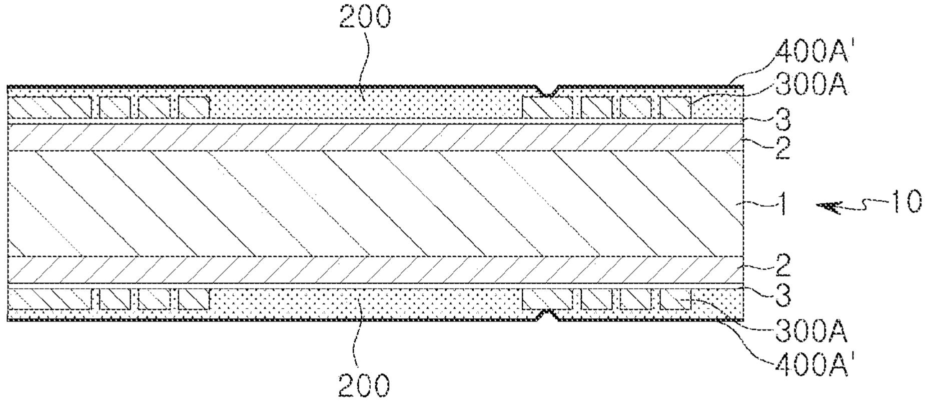
Figure 13F:
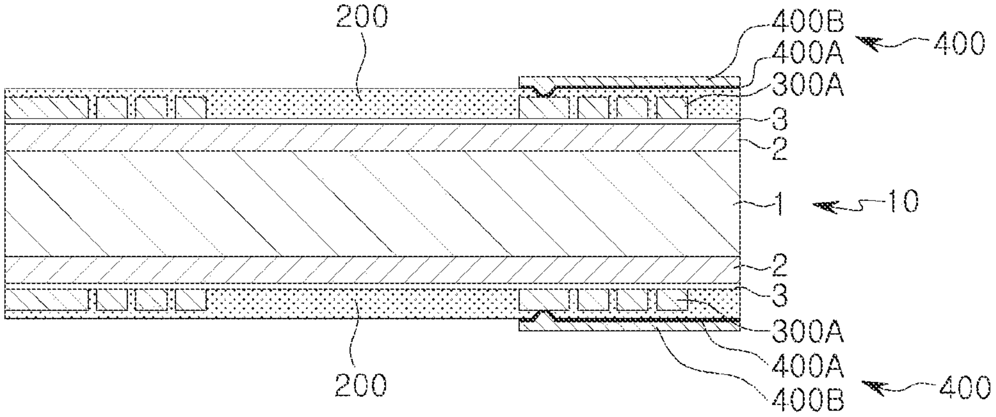
Figure 13G:
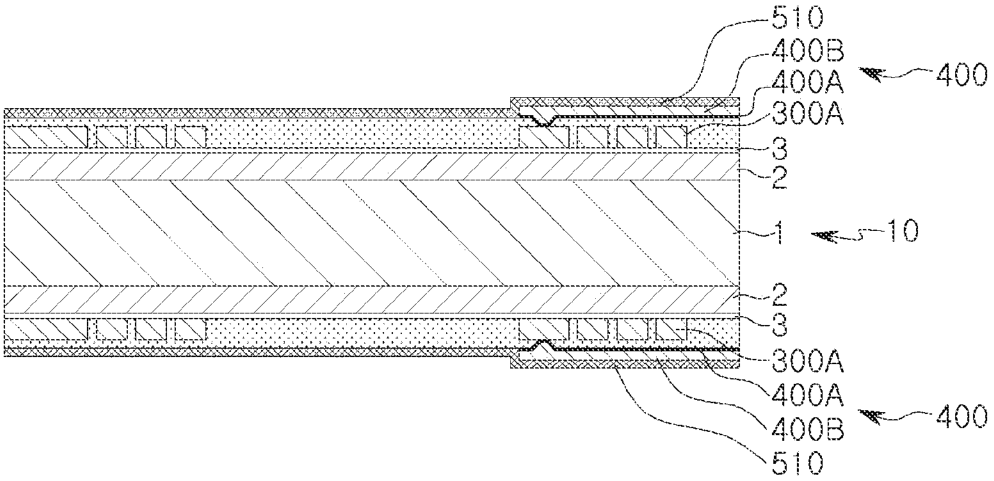
Figure 13H:
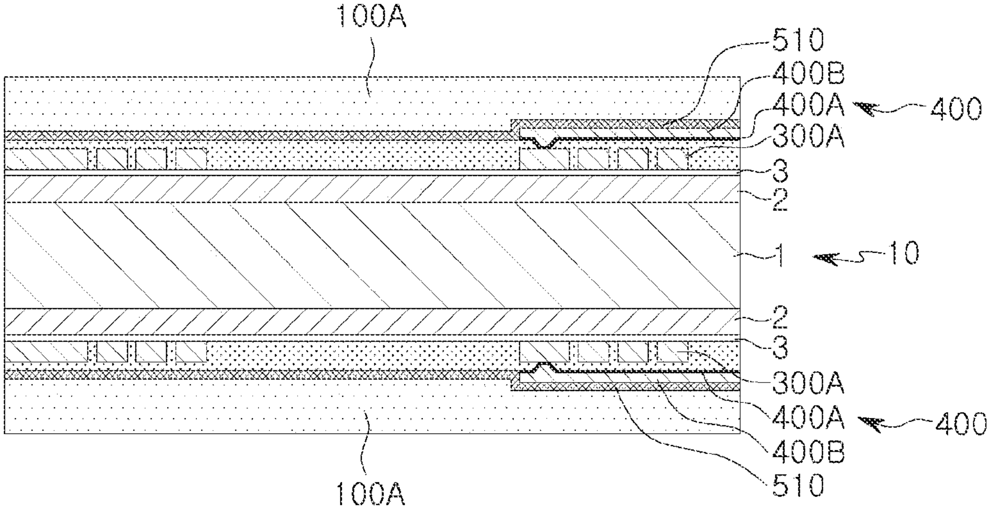
Figure 13I:
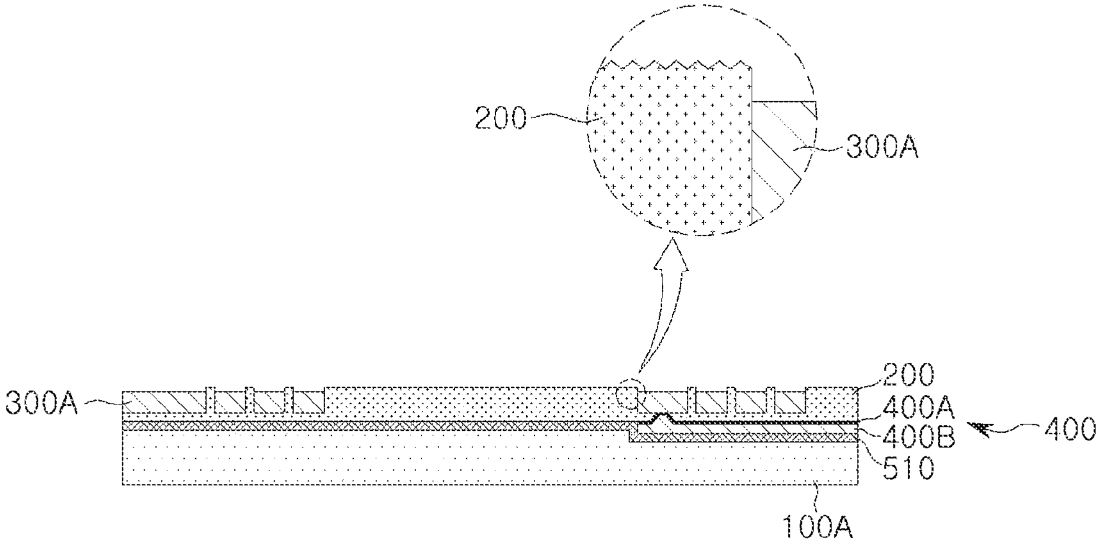
Figure 13J:
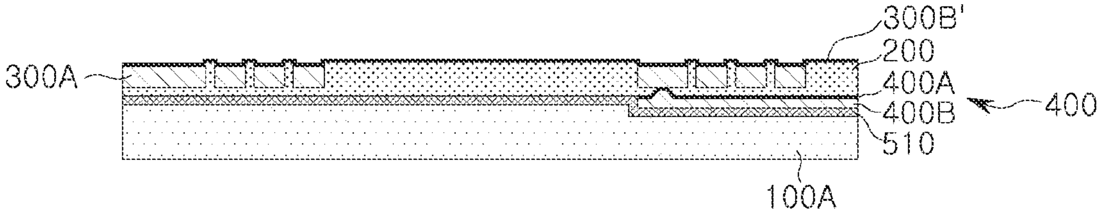
Figure 13K:
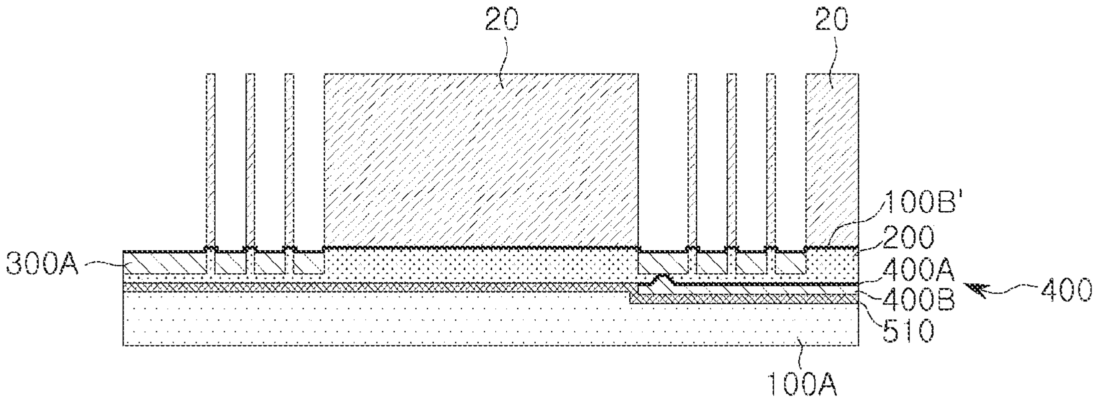
Figure 13L:
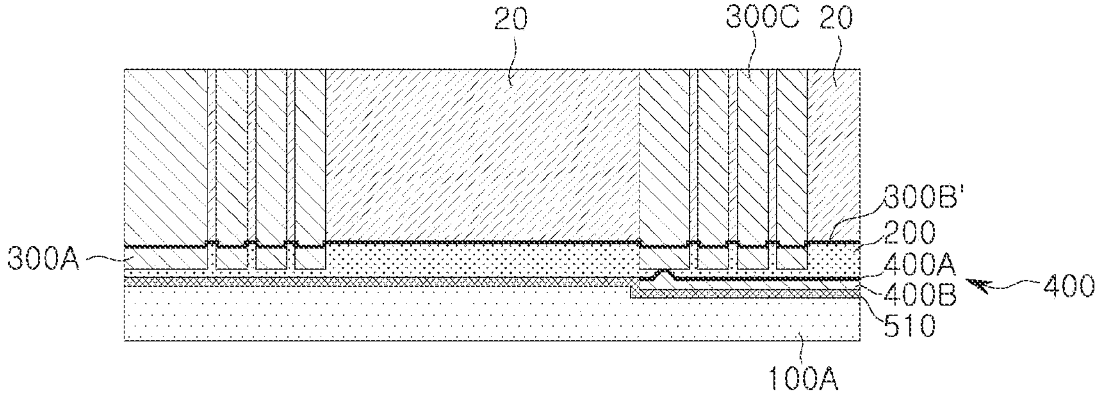
Figure 13M:
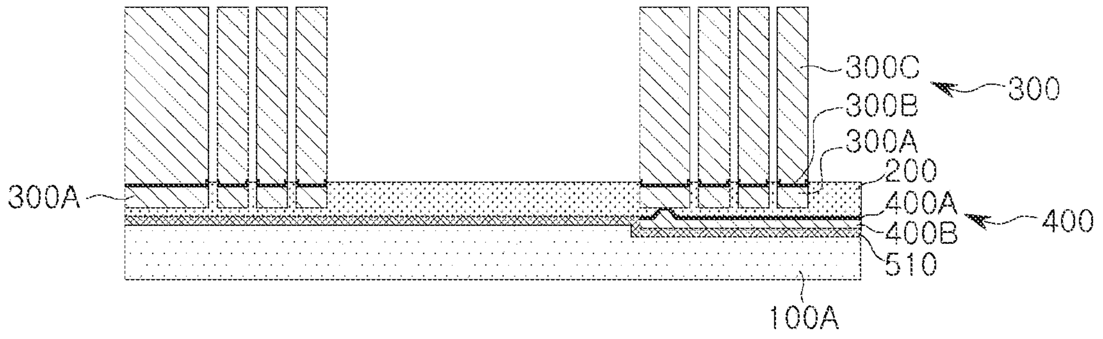

The second and third conductive layers 300B and 300C may be formed by, for example, forming a metal film (300B' of FIG. 13J) on the entire surface of the support portion 200 to which the one surface of the first conductive layer 300A is exposed (FIG. 13J), forming a plating resist (20 of FIG. 13K) for forming a third conductive layer on the metal layer (FIG. 13K), filling an opening of the plating resist with the third conductive layer 300C (FIG. 13L), and removing the plating resist from the first surface of the support portion 200 and removing the exposed portion of the metal layer (FIG. 13M).

The second conductive layer 300B may include a metal different from at least one of the first and third conductive layers 300A and 300C. For example, the second conductive layer 300B may include molybdenum (Mo), and each of the first and third conductive layers 300A and 300C may include copper (Cu). In the process of removing the above-described metal layer (300B6 of FIG. 13J) (FIG. 13M), a portion of the metal layer may be removed by chemical etching. An etchant may react with a metal constituting the metal layer (300B' of FIG. 13J). When the third conductive layer 300C include the same metal as the metal layer, at least a portion of the third conductive layer 300C may also be removed during a process of removing the metal layer to cause conduction loss. In the present embodiment, since the second conductive layer 300B includes a metal different from a metal of the third conductive layer 300C, the above-mentioned conduction loss of the third conductive layer 300C may be prevented. In addition, when the second conductive layer 300B includes a metal different from a metal of the first conductive layer 300A, the exposed portion of the first conductive layer 300A may be prevented from being removed together with at least a portion of the metal layer in a process of removing the metal layer (300B' of FIG. 13J) (FIG. 13M) due to a process error, or the like. As each of the first and third conductive layers 300A and 300C includes copper (Cu), they may include the same metal, but the scope of the present disclosure is not limited thereto.

The lead portion 400 is disposed on a second surface of the support portion 200, opposing the first surface of the support portion 200. An inner end portion of the lead portion 400 may be connected to the inner end portion 300-1 of the coil portion 300 by the via V penetrating through the support portion 200. The external end portion of the lead portion 400 may be exposed to the second surface 102 of the body 100 to be in contact with the second external electrode 700, to be described later, disposed on the second surface 102 of the body 100. An entire space below a first region of the support portion 200 may be free of the lead portion 400 and the lead portion 400 may be disposed on a second region of the support portion 200, where the first region of the support portion 200 is located between the core 110 and the first surface 101 of the body 100 and the second region of the support portion 200 is located between the core 110 and the second surface 102 of the body 100.

Specifically, based on the directions of FIGS. 2 and 4, the lead portion 400 may be disposed on the lower surface of the support portion 200. The via V may penetrate through the support portion 200 in the thickness direction T, such that one end of the via V is in contact with the lower surface of the first conductive layer 300A of the inner end portion 300-1 of the coil portion 300, and the other end of the via V is in contact with the inner end portion of the lead portion 400. The inner end portion 300-1 of the coil portion 300 and the inner end portion of the lead portion 400 may be via pads. A cross section of each of the inner end portion 300-1 of the coil portion 300 and the inner end portion of the lead portion 400 (a cross section parallel to the lower surface of the support portion 200 based on FIG. 2) may have a diameter greater than a maximum diameter of the via V to achieve reliability of connection to the via V, and may be formed to have an overall circular shape, but the scope of the present disclosure is not limited thereto.

The lead portion 400 may have a smaller thickness than the coil portion 300. As an example, the lead portion 400 may have a thickness of 1 μm or more to 20 μm or less. When the lead portion 400 has a thickness of less than 1 μm, a contact area of the lead portion 400 with the second external electrode 700 may be decreased to increase current resistance Rdc. When the lead portion 400 has a thickness greater than 20 μm, a volume of the lead portion 400 may be increased as compared with a component having substantially the same volume, and thus, an effective volume of the magnetic material in the component may be decreased. The thicknesses of the lead portion 400 and the coil portion 300 may refer to dimensions of the lead portion 400 and the coil portion 300 in the thickness direction T, illustrated on a cross section in a length direction L-the thickness direction T (an L-T cross section), in the center in the width direction W, as illustrated in FIG. 2. Each of the dimensions may refer to may refer to one value measured once in the same region, or an arithmetic average of a plurality of values measured two or more in the same region. Alternatively, each of the dimensions may refer to an arithmetic average of a plurality of values, respectively measured once in a plurality of regions, or an arithmetic average of a plurality of values, respectively measured twice or more in a plurality of regions.

A line width of the external end portion of the lead portion 400 may be greater than a line width of the inner end portion of the lead portion 400. The external end portion of the lead portion 400 may be formed to have a lined with greater than a line width of the inner end portion of the lead portion 400, and thus, a contact area between the lead portion 400 and the second external electrode 700 may be increased while the lead portion 400 may be formed to have a relatively small thickness. As an example, the line width of the lead portion 400 may be increased in a direction from the inner end portion to the external end portion.

One end portion of the via V, connected to the inner end portion of the lead portion 400 (referring to a lower region of the via V connected to the inner end portion of the lead portion 400 based on the directions of FIGS. 2 to 4), may have a greater diameter than the other end portion of the via V connected to the inner end portion 300-1 of the coil portion 300 (referring to an upper region of the via V connected to the inner end portion 300-1 of the coil portion 300 based on the directions of FIGS. 2 and 4). In addition, the via V may have a diameter gradually increasing in a direction from one end portion to the other end portion. For example, as illustrated in FIGS. 2 and 3, a cross-sectional shape of the via V may be a tapered shape in which the diameter is decreased in a direction toward the inner end portion 300-1 of the coil portion 300. Since the diameter of one end of the via V is greater than the diameter of the other end of the via V, a void may be prevented from being formed in the via V when the via V is formed by via-fill plating.

Each of the lead portion 400 and the via V may include a first metal layer 400A, disposed to be in contact with the support portion 200, and a second metal layer 400B disposed on the first metal layer 400A. The first metal layer 400A may be a seed layer for forming the second metal layer 400B by plating. The second metal layer 400B may be a plating layer using the first metal layer A as a seed layer. Based on FIGS. 2 and 4, the first metal layer 400A of the lead portion 400, disposed on the lower surface of the support portion 200, and the first metal layer 400A of the via V, disposed in an internal wall of a via hole penetrating through the support portion 200, may be formed together in the same process to be integrated with each other. The second metal layer 400B, disposed on the first metal layer 400A of the lead portion 400, and the second metal layer 400B of the via V, filling the via hole, may be formed together in the same process to be integrated with each other. In this case, the via V and the lead portion 400 may be formed together in the same process to be integrated with each other. The via V and the lead portion 400 may not be distinguished by a boundary therebetween, and may be distinguished by positions or regions thereof in relation to the support portion 200. However, the scope of the present disclosure is not limited thereto, and the via V and the lead portion 400 may be formed in different processes to be distinguished by a boundary therebetween.

At least a portion of a side surface of the first metal layer 400A of the lead portion 400 may be in contact with the first insulating layer 510 to be described later. For example, the second metal layer 400B of the lead portion 400 may be formed to expose the side surface of the first metal layer 400A, and may not be in contact with the lower surface of the support portion 200. Accordingly, at least a portion of the side surface of the first metal layer 400A may be brought into contact with the first insulating layer 510, to be described later, formed to cover the lead portion 400.

The first metal layer 400A may be formed by electroless plating or vapor deposition such as or sputtering, and may include at least one of copper (Cu), aluminum (Al), silver (Ag), tin (Sn), gold (Au), Nickel (Ni), lead (Pb), titanium (Ti), chromium (Cr), molybdenum (Mo), or alloys thereof. The first metal layer 400A may include at least one layer. The second metal layer 400B may be formed by performing electroplating using the first metal layer 400A as a seed, and may include at least one of copper (Cu), aluminum (Al), silver (Ag), tin (Sn), gold (Au), nickel (Ni), lead (Pb), titanium (Ti), chromium (Cr), or alloys thereof. The second metal layer 400B may at least one layer.

The first insulating layer 510 may be disposed on the second surface of the support portion 200 to cover the lead portion 400. Specifically, based on the directions of FIGS. 1 to 4, the first insulating layer 510 may be disposed on the lower surface of the support portion 200 to cover the lead portion 400 and may be formed as a layer conformal along a lower surface of the support portion 200 on which the lead portion 400 is not disposed, a side surface of the lead portion 400, and a lower surface of the lead portion 400.

The first insulating layer 510 may be formed by vapor deposition such as chemical vapor deposition, or may be formed by applying a liquid insulating material to the second surface of the support portion 200, or may be formed by laminating an insulating material such as an insulating film on the second surface of the support portion 200.

The first insulating layer 510 may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. The first insulating layer 510 may further include an insulating filler such as an inorganic filler, but the present disclosure is not limited thereto.

In FIGS. 1 to 3, the first insulating layer 510 is illustrated as being disposed on the entire lower surface of the support portion 200. However, this is only an example, and the first insulating layer 510 may be disposed in only a certain region of the first surface of the support portion 200 to cover the lead portion 400.

The second insulating layer 520 may be disposed on the first surface of the support portion 200 to cover the coil portion 300. Specifically, the second insulating layer 520 may be disposed on the upper surface of the support portion 200 to cover the coil portion 300, based on the directions of FIGS. 1 to 4, and may be disposed between the coil portion 300 and the body 100 and between the upper surface of the support portion 200 and the body 100. The second insulating layer 520 may be disposed between the first turn 310 of the coil portion 300 and the core 110, in a space between adjacent turns of the coil portion 300, and on an external side surface of each of the third and fourth turns 330 and 340 of the coil portion 300 to be disposed on an upper surface of each of the first to fourth turns 310, 320, 330, and 340 of the coil portion 300.

The second insulating layer 520 may be provided to insulate the coil portion 300 and the body 100 from each other, and may include a known insulating material such as parylene, but the present disclosure is not limited thereto. As another example, the second insulating layer 520 may include an insulating material such as an epoxy resin other than parylene. The second insulating layer 520 may be formed by vapor deposition, but the present disclosure is not limited thereto. As another example, the second insulating layer 520 may be formed by laminating and curing an insulating film for forming a second insulating layer on the first surface of the support portion 200 on which the coil portion 300 is formed. Alternatively, the second insulating layer 520 may be formed by applying an insulating paste for forming a second insulating layer to the first surface of the support portion 200, in which the coil portion 300 is formed, and curing the applied insulating paste.

Each of the first and second insulating layers 510 and 520 may have a thickness of 5 μm or more and 15 μm or less. As an example, when the first insulating layer 510 has a thickness of less than 5 μm, it may be difficult to form a uniform insulating structure. For example, since the insulating structure is not formed in some sections, component characteristics may be deteriorated due to a short-circuit or a leakage current. As an example, when the first insulating layer 510 has a thickness greater than 15 μm, volumes of the conductor component (a coil portion and a lead portion) and a magnetic material may be decreased based on the same volume of a component to deteriorate component characteristics.

The external electrodes 600 and 700 may be disposed to be spaced apart from each other on the sixth surface 106 of the body 100, may be in contact with the external end portions of the coil portion 300 and the lead portion 400, respectively. Specifically, the first external electrode 600 may be disposed on the sixth surface 106 of the body 100 to extend to the first surface 101 of the body 100 so as to be in contact with the external end portion 300-2 of the coil portion 300 exposed to the first surface 101 of the body 100. The second external electrode 700 may be disposed to be spaced apart from the first external electrode 600 on the sixth surface 106 of the body 100, and may extend to the second surface 102 of the body 100 so as to be contact with the external end portion of the lead portion 400 exposed to the second surface 102 of the body 100. In FIG. 1, each of the external electrodes 600 and 700 is illustrated as having a shape surrounding five surfaces of the body 100. However, this is only an example, and the scope of the present embodiment is not limited thereto. As an example, the first external electrode 600 may be a portion disposed in a portion of the first surface 101 of the body 100, including a region in which the external end portion 300-2 of the coil portion

300 is exposed (a portion of the first surface 101 of the body 100 in the thickness direction or a portion of the first surface 101 of the body in the width direction W, based on FIG. 1), so as to be in contact with the external end portion 300-2 of the coil portion 300 and so as not to cover the other region of the first surface 101 of the body 100. As another example, each of the first and second external electrodes 600 and 700 may only be disposed on the sixth surface 106 of the body 100 to be connected to the external end portion 300-2 of the coil portion 300 and the external end portion of the lead portion 400 by a connection electrode, penetrating through the body 100 and the first insulating layer 510, or the like. As another example, the first external electrode 600 may be formed to have a shape, covering the first surface 101 of the body 100 and extending to a portion of the sixth surface 106 of the body 100, (an L shape). As another example, the first external electrode 600 may be formed to cover the first surface 101 of the body 100 so as to be in contact with and connected to the external end portion 300-2 of the coil portion 300 and to extend to at least a portion of each of the fifth and sixth surfaces 105 and 106 of the body 100, but may be formed so as not to extend to the third and fourth surfaces 103 and 104 of the body 100. As another example, the first external electrode 600 and the second external electrode 700 may be asymmetrically formed.

The external electrodes 600 and 700 may be formed by vapor deposition such as sputtering and/or plating. However, the present disclosure is not limited thereto, and the external electrodes 600 and 700 may be formed by applying a conductive resin, including conductive powder particles such as copper (Cu), to a surface of the body 100 and curing the applied conductive resin.

Each of the external electrodes 600 and 700 may include a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto. The external electrodes 600 and 700 may be formed to have a single-layer structure or a multilayer structure. As an example, each of the external electrodes 600 and 700 may include a first electrode layer, a second electrode layer disposed on the first electrode layer and including nickel (Ni), and a third electrode layer disposed on the second electrode layer and including tin (Sn). The first electrode layer may be a metal layer (for example, a plating layer) including a single metal. Alternatively, the first electrode layer may be, for example, a conductive resin layer including conductive powder particles including copper (Cu) and/or silver (Ag) and a resin, but the scope of the present disclosure is not limited thereto.

The surface insulating layer 800 may cover a region, in which the external electrodes 600 and 700 are not formed, of the first to sixth surfaces 101, 102, 103, 104, 105, and 106 of the body 100. The surface insulating layer 800 may be used as a plating resist when the external electrodes 600 and 700 are formed by electroplating, and may prevent plating blurring. In addition, the surface insulating layer 800 may be disposed to extend upwardly of at least a portion of the external electrodes 600 and 700. Thus, the surface insulating layer 800 may cover a region, other than regions of the external electrodes 600 and 700 disposed on the sixth surface 106 of the body 100, to prevent short-circuits between other components disposed adjacent to the coil component according to the present embodiment on a mounting board, or the like, together with the coil component.

Accordingly, in the coil component 1000 according to the present embodiment, the coil portion 300 having an overall planar spiral shape may be formed on only one surface of the support portion 200 to reduce an overall thickness of the coil component 1000, as compared with a thin-film type coil component according to the related art in which a coil pattern having a planar spiral shape is formed on both surfaces of a support substrate. In the coil component 1000, the coil portion 300 may include the first conductive layer 300A embedded in the first surface of the support portion 200 (e.g., the upper surface of the support portion 200 based on the direction of FIG. 4). Therefore, as compared with the case in which only the coil portion is formed to protrude from one side of the support portion, a thickness and an aspect ratio of each of the turns 310, 320, 330, and 340 of the coil portion 300 may be increased to improve component characteristics. Moreover, in the coil component 1000, the first region 100A of the body 100 may serve as a base between processes together with the support portion 200 to prevent issues such as difficulty in handling between processes and warpage of the support portion 200 caused by a relatively small thickness of the support portion 200.

Hereinafter, an example of a method of manufacturing a coil component according to the present embodiment will be described with reference to FIGS. 13A to 13P.

Referring to FIG. 13A, a support member 10 may be prepared.

The support member 10 may include a carrier metal layer 2 and an ultrathin metal layer 3 sequentially laminated on both sides of an insulating portion 1. The insulating portion 1 may be a portion in which a woven glass fiber is impregnated with a resin, but the scope of the present disclosure is not limited thereto. Each of the carrier metal layer 2 and the ultrathin metal layer 3 may include copper (Cu), but the scope of the present disclosure is not limited thereto.

The ultrathin metal layer 3 may have one surface, disposed to be in contact with the carrier metal layer 2, and the other surface exposed outwardly thereof. Surface roughness of the other surface of the ultrathin metal layer 3 may be greater than surface roughness of the one surface of the ultrathin metal layer 3. A first conductive layer 300A and a support portion 200 to be described later may be formed on the other surface of the ultrathin metal layer 3. Due to the relatively high surface roughness of the other side of the ultrathin metal layer 3, bonding strength between the ultrathin metal layer 3 and each of the first conductive layer 300A and the support portion 200 may be improved. For this reason, the surface roughness of the ultrathin metal layer 3 may be transferred to one surface of each of the first conductive layer 300A and the support portion 200 in contact with the other surface of the ultrathin metal layer 3. The term "surface roughness" indicates a difference in a degree of magnitude of fine prominences-depressions formed on a surface when the surface is processed. The surface roughness may be generated by a tool used to process the surface, a processing method, scratches generated in the surface, rust, etching, and the like. A cross section of a surface, taken by cutting the surface on a plane perpendicular to the surface, may be formed to have a height. The surface roughness may refer to an arithmetic average of absolute values of high and low portions from an imaginary centerline on a corresponding cross section (centerline average roughness Ra). However, the surface roughness is not limited to the centerline surface roughness Ra, and may refer to ten-point average roughness Rz or a maximum height roughness Ry.

The support member 10 may further include a release layer between the carrier metal layer 2 and the ultrathin metal layer 3, but the scope of the present disclosure is not limited thereto.

Referring to FIG. 13B, a first conductive layer 300A may be formed on the support member 10.

The first conductive layer 300A may be formed by forming a plating resist for forming the first conductive layer 300A on both surfaces of the support member 10, forming an opening in the plating resist, and filling the opening of the plating resist with electroplating using the ultrathin metal layer 2 as a seed layer. Then, the plating resist may be removed from both surfaces of the support member 10. Since the opening of the plating resist is formed to have substantially the same shape as the coil portion 300, the first conductive layer 300A filling the opening of the plating resist may have substantially the same shape as the coil portion 300. The first conductive layer 300A may include, for example, copper (Cu), but the scope of the present disclosure is not limited thereto.

The plating resist may be formed by laminating an insulating film on both surfaces of the support member 10 on which the first conductive layers 300A are formed, respectively. Alternatively, the plating resist may be formed by applying and curing a liquid insulating material. The opening of the plating resist may be formed by a photolithography process when the plating resist includes a photosensitive resin, but the scope of the present disclosure is not limited thereto. When the plating resist includes a photosensitive resin, the plating resist may be a negative type or a positive type.

Referring to FIG. 13C, a support portion 200 may be formed on the support member 10.

The support portion 200 may be formed by forming an insulating material for forming the support portion 200 on both surface of the support member 10 to cover the first conductive layer 300A. The insulating material for forming the support portion 200 may be an insulating film such as an ABF or a PID film, but the scope of the present disclosure is not limited thereto. In the case of the present embodiment, the support portion 200 may be formed by laminating the insulating film on the support member 10 and pressing and heating the laminated insulating film. Accordingly, surface roughness of the first surface of the support portion 200, disposed to be in contact with the support member 10, may be greater than surface roughness of a second surface of the support portion 200 opposing the first surface of the support portion 200.

Referring to FIG. 13D, a via hole VH may be formed in the support portion 200.

The via hole VH may be formed in the support portion 200 to expose at least a portion, constituting the inner end portion 300-1 of the coil portion 300, of the first conductive layer 300A. The via hole VH may be formed by a laser drilling process or a photolithography process when the support portion 200 includes a photosensitive insulating resin. The via hole VH may be formed by a laser drilling process when the support portion 200 includes a thermosetting insulating resin.

Referring to FIG. 13E, a metal layer 400A' may be formed on the support member 10.

The metal layer 400A' may be configured to be the first metal layer 400A of the lead portion 400 through a subsequent process, and may be seed layer for forming a second metal layer 400B of the lead portion 400 on the support portion 200 by plating. The metal layer 400A' may be formed on the entire surface of the support portion 200 having an internal wall of the via hole VH. The metal layer 400A' may be formed by a vapor deposition process such as an electroless plating process or a sputtering process. The metal layer 400A' may include copper (Cu), aluminum (Al), silver (Ag), tin (Sn), gold (Au), nickel (Ni), lead (Pb), titanium (Ti), chromium (Cr), molybdenum (Mo), or alloys thereof, and may include at least one layer.

Referring to FIG. 13F, a lead portion 400 and a via V may be formed on the support portion 200.

More specifically, the lead portion 400 and the via V may be formed by forming a plating resist on the support member 10 on which the metal layer 400A' is formed, forming an opening in the plating resist, filling the opening with the second metal layer 400B by plating, removing the plating resist, and removing a portion, exposed externally by removing the plating resist, of the metal layer 400A'. The second metal layer 400B may include copper (Cu), aluminum (Al), silver (Ag), tin (Sn), gold (Au), nickel (Ni), lead (Pb), titanium (Ti), chromium (Cr), or alloys thereof, and may include at least one layer. For this reason, in the case of the present embodiment, the first metal layer 400A of the lead portion 400 and the first metal layer 400A of the via V may be integrated with each other, and the second metal layer 400B of the lead portion 400 and the second metal layer 400B of the via V may be integrated with each other.

Referring to FIG. 13G, a first insulating layer 510 may be formed on the support member 10.

The first insulating layer 510 may be formed on an exposed surface of the support portion 200 (an upper surface of the support portion 200, disposed above the support member 10, and a lower surface of the support portion 200, disposed below the support member 10, based on FIG. 13G) to cover the lead portion 400. The first insulating layer 510 may be formed by vapor deposition such as chemical vapor deposition, or may be formed by applying a liquid insulating material to the support member 10, or may be formed by laminating an insulating material, such as an insulating film, on the support member 10.

Referring to FIG. 13H, a first region 100A of the body 100 may be formed on the support member 10.

The first region 100A of the body 100 may be formed by laminating at least one magnetic composite sheet on the support member 10. The magnetic composite sheet may include magnetic metal powder particles and a resin. The magnetic metal powder particles may include at least one selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder. The magnetic metal powder particle may be amorphous or crystalline. For example, the magnetic metal powder particle may be a Fe—Si—B—Cr-based amorphous alloy powder, but is not limited thereto. Each of the magnetic metal powder particles may have an average diameter of about 0.1 μm to 30 μm, but is not limited thereto. The resin may include epoxy, polyimide, liquid crystal polymer, or the like, in a single form or combined forms, but is not limited thereto.

Referring to FIG. 13I, the support member 10 may be removed.

Hereinafter, a description will be provided based on the support portion 200 disposed below the support member 10 illustrated in FIG. 13H, but the same description may also be applied to the support portion 200 disposed above the support member 10.

The support member 10 may be separated from the support portion 200 by separating the carrier metal layer 2 and the ultrathin metal layer 3 from each other. For example, the ultrathin metal layer 3 may be separated from the carrier metal layer 2 while being attached to the first surface of the support portion 200 (the upper surface of the support portion 200 of FIG. 13I). Then, the ultrathin metal layer 3 may be removed from the support portion 200. The ultrathin metal layer 3 may be removed by chemical etching. When the ultrathin metal layer 3 and the first conductive layer 300A include the same metal, at least a portion of the first conductive layer 300A may react with an etchant to be removed. Accordingly, a groove may be formed in the one surface of the first conductive layer 300A (an upper surface of the first conductive layer 300A of FIG. 13I). As described above, the surface roughness of the other surface of the ultrathin metal layer 3 may be transferred to the first surface of the support portion 200 and the upper surface of the first conductive layer 300A, but at least a portion of the upper surface of the first conductive layer 300A may be removed together in a process of removing the ultrathin metal layer 3. As a result, surface roughness of the first surface of the support portion 200 may be greater than surface roughness of the upper surface of the first conductive layer 300A after the process. For example, the first surface of the support portion 200 and the upper surface of the first conductive layer may be different in level as well as in surface roughness.

Referring to FIG. 13J, a metal layer 300B' may be formed on the entire surface of the support portion 200.

The metal layer 300B' may be formed on the entire surface of the support portion 200 having an internal surface (an internal wall and a bottom surface) of a groove formed in the upper surface of the first conductive layer 300A. Due to the relatively small thickness of the metal layer 300B', the metal layer 300B' may be formed to have a shape corresponding to a shape of the first surface of the support portion 200.

The metal layer 300B' may be configured to be the second metal layer 300B through a subsequent process, and may be seed layer for forming a third conductive layer 300C of the coil portion 300 on the support portion 200 by plating. The metal layer 300B' may be formed by a vapor deposition process such as an electroless plating process or a sputtering process. The metal layer 300B' may include copper (Cu), aluminum (Al), silver (Ag), tin (Sn), gold (Au), nickel (Ni), lead (Pb), titanium (Ti), chromium (Cr), molybdenum (Mo), or alloys thereof, and may include at least one layer. In the case of the present embodiment, the metal layer 300B' may include a metal (for example, molybdenum (Mo)) different from a material of the first conductive layer 300A, but the scope of the present disclosure is not limited thereto.

Referring to FIG. 13K, an insulating wall 20 may be formed on the first surface of the support portion 200.

The insulating wall 20 may be a plating resist for selectively plating the third metal layer 300C. The insulating wall 20 may be formed by forming an insulating material for forming the insulating wall 20 on the entire surface of the support portion 200, on which the metal layer 300B' is formed, and then forming an opening corresponding to a shape of the coil portion 300. The opening may be formed by a photolithography process, but the present disclosure is not limited thereto. A diameter of the opening may be substantially the same as a line width of the first conductive layer 300A.

The insulating wall 20 may include, for example, a photosensitive material including a cyclic ketone compound and an ether compound having a hydroxy group as main ingredients. In this case, the cyclic ketone compound may be, for example, cyclopentanone, or the like, and the ether compound having a hydroxy group may be, for example, polypropylene glycol monomethyl ether. Alternatively, the insulating wall 20 may include a photosensitive material including a bisphenol-based epoxy resin as a main ingredient. In this case, the bisphenol-based epoxy resin may be, for example, a bisphenol-A novolac epoxy resin, a bisphenol-A diglycidyl ether bisphenol-A polymer resist, or the like. However, the scope of the present disclosure is not limited thereto.

Referring to FIG. 13L, a third conductive layer 300C may be formed on the insulating wall 20.

The third conductive layer 300C may be formed by plating-filling an opening of the insulating wall 20 using the metal layer 300B' as a seed layer. The third conductive layer 300C may include, for example, copper (Cu), but the scope of the present disclosure is not limited thereto. The third conductive layer 300C may be overplated to a thickness greater than a thickness of the insulating wall 20, and may then be polished to expose the upper surface of the insulating wall 20, but the scope of the present disclosure is not limited thereto. The third conductive layer 300C may be formed by a single plating process such that an interface is not present therein, or may be formed by at least two plating processes such that an interface is present therein.

Referring to FIG. 13M, the insulating wall 20 and the metal layer 300B' may be removed.

The insulating wall 20 and a portion of the metal layer 300B' (based on FIG. 13L, a certain region of the metal layer 300B' in which the insulating wall 20 is disposed thereon) may be removed together in the same process, or may be removed in different processes, respectively. For example, the insulating wall 20 may be removed using a stripper or laser.

Figure 13N:
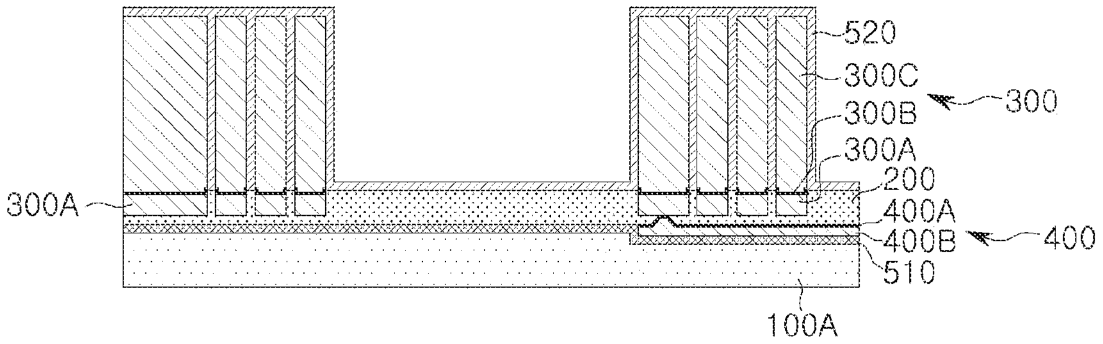

Referring to FIG. 13N, a second insulating layer 520 may be formed on the first surface of the support portion 200.

The second insulating layer 520 may be formed on the first surface of the support portion 200 to cover the coil portion 300. Specifically, the second insulating layer 520 may be formed to have a shape of a film conformal along a surface of the first surface of the support portion 200 on which the third conductive layer 300C is formed to protrude. For example, based on FIG. 13N, the second insulating layer 520 may be continuously disposed on an upper surface of the support portion 200, an internal side surface of a first turn 310 of the coil portion 300, a space between adjacent turns of the coil portion 300, an external side surface of each of a third turn 330 and a fourth turn 340 of the coil portion 300, and an upper surface of each of the first to fourth turns 310, 320, 330, and 340 of the coil portion 300.

The second insulating layer 520 may include a known insulating material such as parylene, but the present disclosure is not limited thereto. As another example, the second insulating layer 520 may include an insulating material such as epoxy resin other than parylene. The second insulating layer 520 may be formed by vapor deposition, but the present disclosure is not limited thereto. As another example, the second insulating layer 520 may be formed by laminating an insulating film for forming the second insulating layer 520 on the first surface of the support portion 200, on which the coil portion 300 is formed, and curing the laminated insulating film. Alternatively, the coil portion 300 may be formed by applying an insulating paste for forming the second insulating layer 520 to the first surface of the support portion 200, on which the coil portion 300 is formed, and curing the applied insulating paste.

Figure 13O:
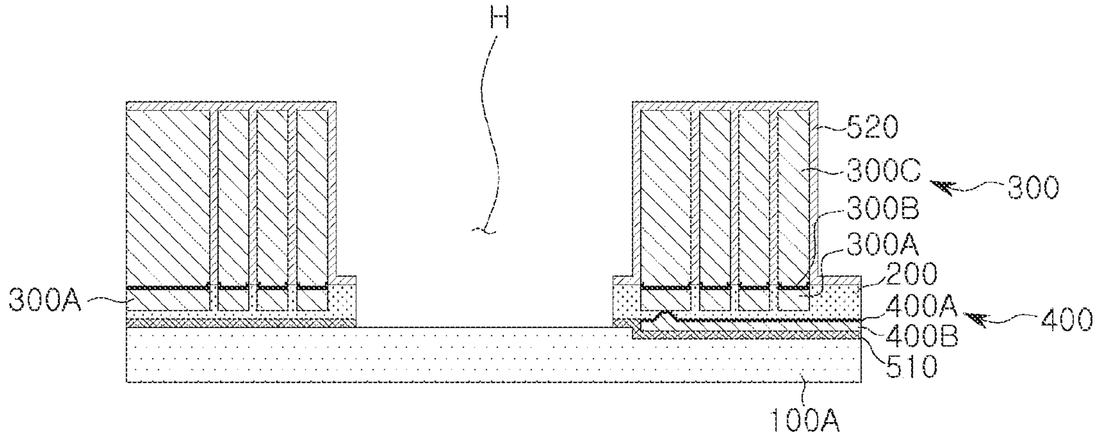

Referring to FIG. 13O, a portion of the support portion 200 may be removed.

Specifically, a hole H may be formed by removing the other region of the support portion 200, except for a region of the support portion 200 corresponding to a region formed when the coil portion 300 and the lead portion 400 are projected in a thickness direction T. A portion of the support portion 200 may be removed by, for example, a laser, but the scope of the present disclosure is not limited thereto. In the present process, the first and second insulating layers 510 and 520, which have respectively been formed on both surfaces of the support portion 200 having a plate shape, may also be processed together. Accordingly, the support 200 and each of the first and second insulating layers 510 and 520 may have substantially the same shape and area after the present process.

Figure 13P:
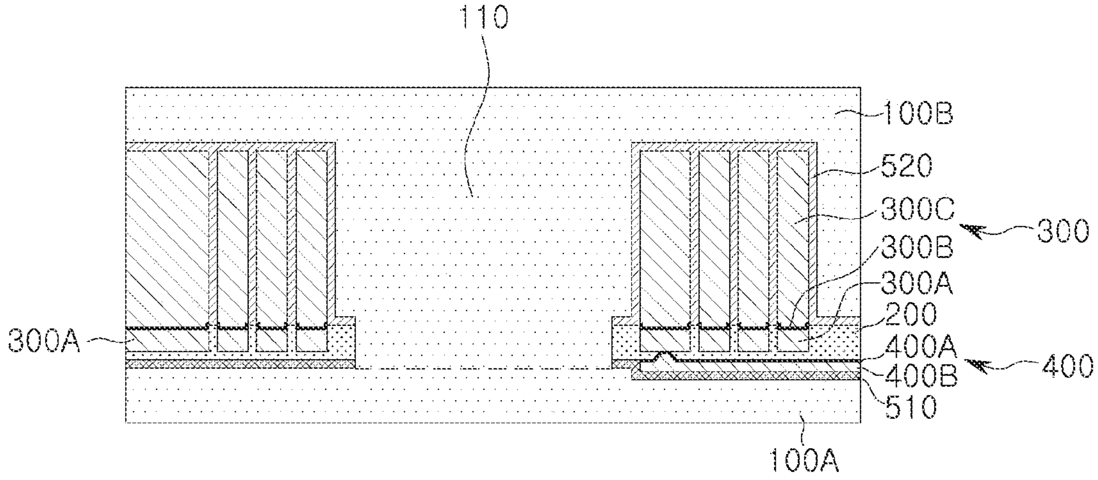

Referring to FIG. 13P, a second region 100B of the body 100 may be formed.

The second region 200B of the body 100 may be formed by laminating at least one magnetic composite sheet on the support member 10. The magnetic composite sheet may include magnetic metal powder particles and a resin. The magnetic metal powder particles may include at least one selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder. The magnetic metal powder particle may be amorphous or crystalline. For example, the magnetic metal powder particle may be a Fe—Si—B—Cr-based amorphous alloy powder, but is not limited thereto. Each of the magnetic metal powder particles may have an average diameter of about 0.1 μm to 30 μm, but is not limited thereto. The resin may include epoxy, polyimide, liquid crystal polymer, or the like, in a single form or combined forms, but is not limited thereto.

Although not illustrated, external electrodes 600 and 700 and a surface insulating layer 800 may be formed on a surface of the body 100 after the second region 100B of the body 100 is formed.

Figure 5:
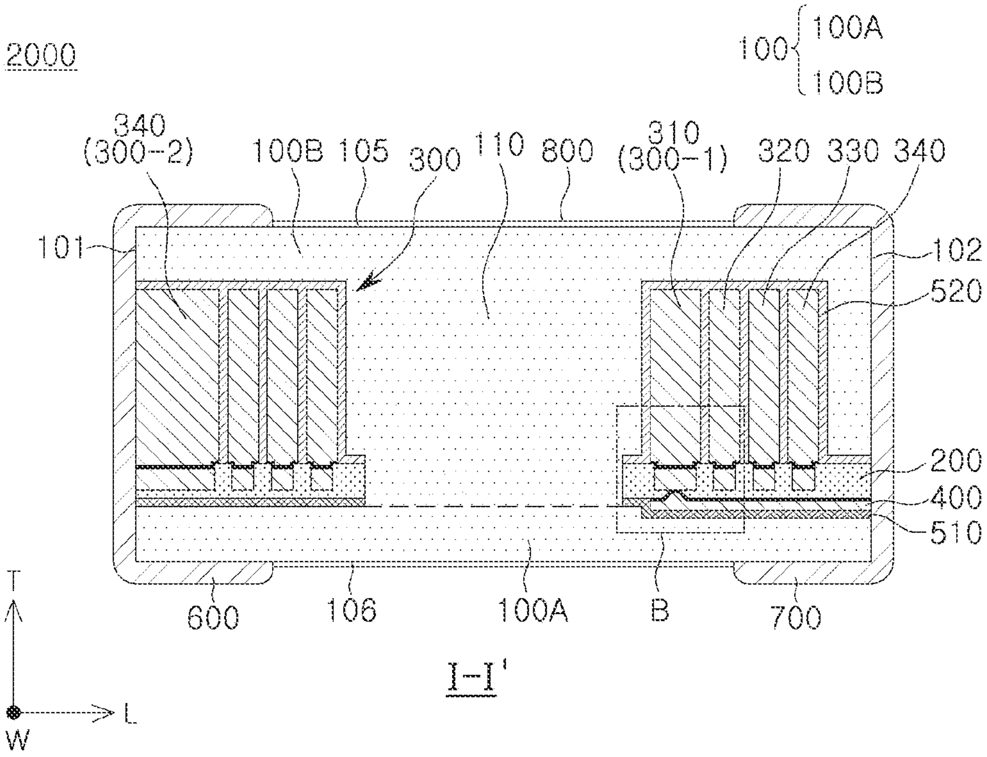
FIG. 5 is a schematic perspective view of a coil component according to a second exemplary embodiment of the present disclosure, and corresponds to FIG. 2.
Figure 6:
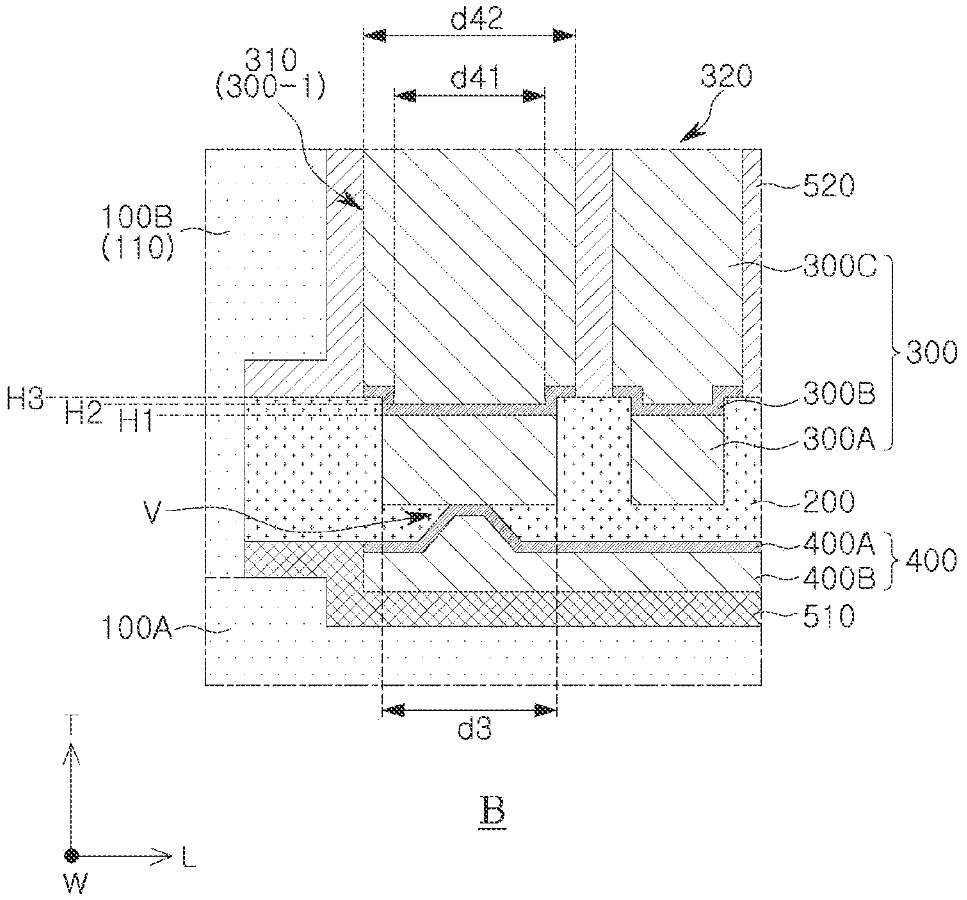
FIG. 6 is an enlarged view of portion 'B' of FIG. 5.

FIG. 5 is a schematic perspective view of a coil component according to a second exemplary embodiment of the present disclosure, and corresponds to FIG. 2. FIG. 6 is an enlarged view of portion 'B' of FIG. 5.

Referring to FIGS. 1 to 4 and FIGS. 5 and 6, a difference between a coil component 2000 according to a second embodiment and the coil component 1000 according to the first embodiment lies in a second conductive layer 300B and a third conductive layers 300C. Therefore, the second embodiment will be described while focusing on only the second and third conductive layers 300B and 300C, and the description of the first embodiment may be equivalently applied to the other configurations of the second embodiment. In addition, the modified examples, described in the first embodiment, may be equivalently applied to the second embodiment.

Referring to FIGS. 5 and 6, in the coil component 2000, at least a portion of the second conductive layer 300B may extend to be in contact with a first surface of a support portion 200 and a line width d42 of a second region of the third conductive layer 300C may be greater than a line width d3 of a first conductive layer 300A. According to one exemplary embodiment, a maximum line width of the second conductive layer 300B may be greater than the line width d3 of the first conductive layer 300A.

The coil component 2000 may be implemented by forming the third conductive layer 300C by electroplating in such a manner that both end portions of an opening of an insulating wall (20 of FIG. 13K) expose both ends of the first conductive layer 300A in a line width direction (the length direction L of each of FIGS. 5 and 6).

In the coil component 2000, the line width d42 of the second region of the third conductive layer 300C may be greater than the line width d3 of the first conductive layer 300A, so that an opening of plating resist (20 of FIG. 13K) for forming a conductive layer may be formed to be relatively large. Thus, reliability of a connection between the first conductive layer 300A and the third conductive layer 300C may be secured. For example, even when a misalignment occurs between openings of the first conductive layer 300A and the plating resist (20 of FIG. 13K) for forming the third conductive layer 300C due to a process error, or the like, reliability of a connection between the first conductive layer 300A and the third conductive layer 300C may be secured.

As illustrated in FIGS. 5 and 6, a line width d41 of a first region of the third conductive layer 300C may be smaller than the line width d3 of the first conductive layer 300A due to a thickness of the second conductive layer 300B.

Figure 7:
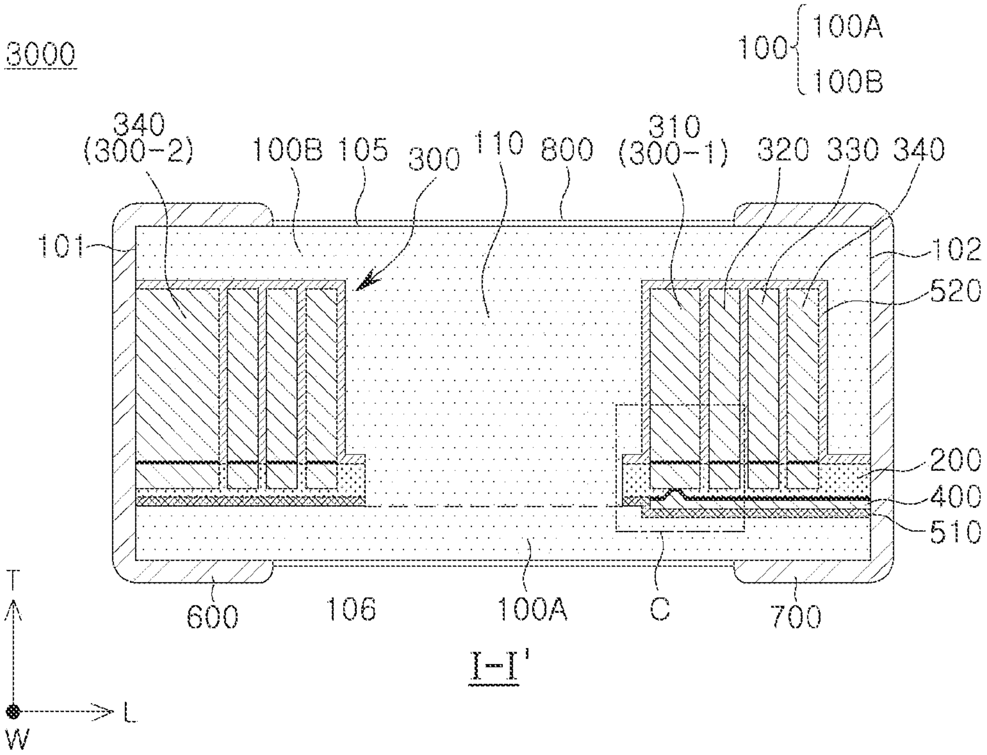
FIG. 7 is a schematic perspective view of a coil component according to a third exemplary embodiment of the present disclosure, and corresponds to FIG. 2.
Figure 8:
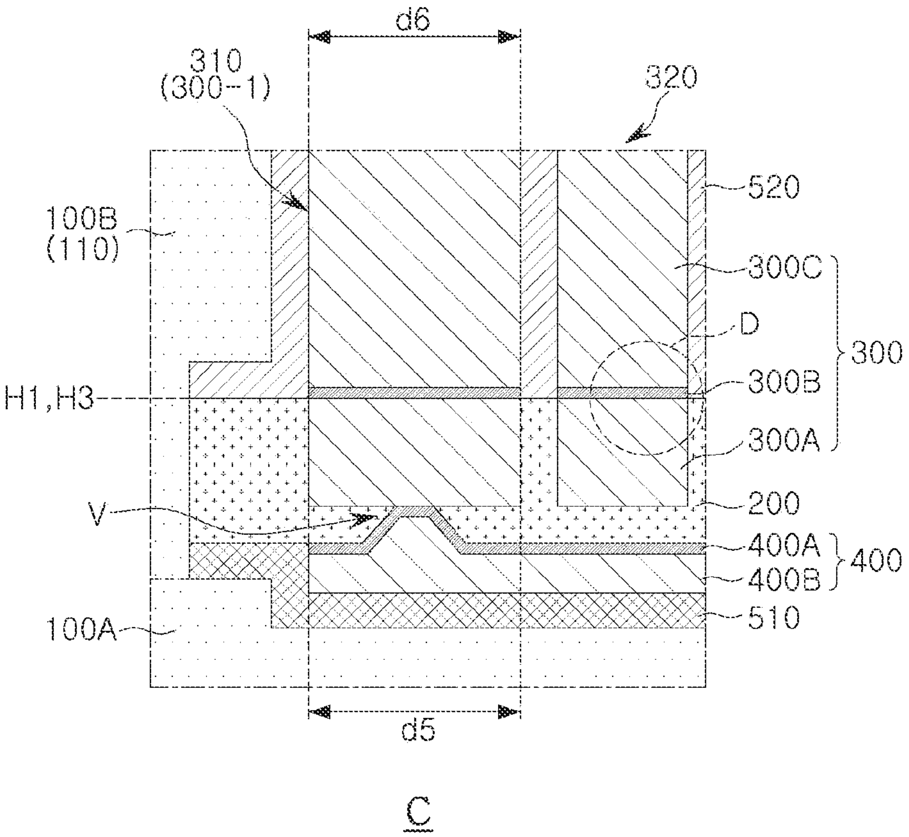
FIG. 8 is an enlarged view of portion 'C' of FIG. 7.

FIG. 7 is a schematic perspective view of a coil component according to a third exemplary embodiment of the present disclosure, and corresponds to FIG. 2. FIG. 8 is an enlarged view of portion 'C' of FIG. 7, and FIG. 9 is an enlarged view of portion 'D' of FIG. 8.

Referring to FIGS. 1 to 4 and FIGS. 7 to 9, a difference between a coil component 3000 according to a third embodiment and the coil component 1000 according to the first embodiment lies in a second conductive layer 300B. Therefore, the third embodiment will be described while focusing on only the second conductive layer 300B, and the description of the first embodiment may be equivalently applied to the other configurations of the third embodiment. In addition, the modified examples, described in the first embodiment, may be equivalently applied to the third embodiment.

Figure 9:
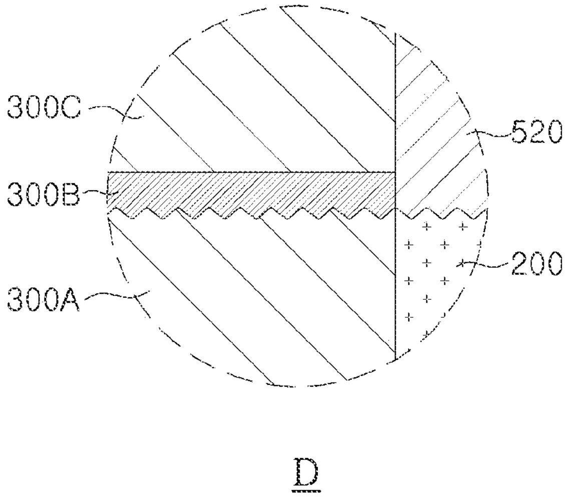
FIG. 9 is an enlarged view of portion 'D' of FIG. 8.

Referring to FIGS. 7 to 9, in the coil component 3000, one surface of a first conductive layer 300A may be disposed on substantially the same level as the first surface of a support portion 200 (H1=H3), and the second conductive layer 300B may be in contact with the one surface of the first conductive layer 300A to be disposed on a higher level than the support portion 200. For example, in the case of the third embodiment, unlike in the first embodiment, the level H1 of the one surface of the first conductive layer 300A (an upper surface of the first conductive layer 300A based on the directions of FIGS. 7 to 9) may be substantially the same as the level H3 of the first surface of the support portion 200 (an upper surface of the support portion 200 based on the directions of FIGS. 7 to 9).

In the third embodiment, unlike the first embodiment, as an example, after a process of separating the carrier metal layer (2 of FIGS. 13A to 13H) and the ultrathin metal layer (3 of FIGS. 13A to 13H) from each other (see FIG. 13H to 13I), the ultrathin metal layer 3 itself may not be removed and may be used as a seed layer for forming a third conductive layer 300C. As another example, an ultrathin metal layer (3 of FIGS. 13A to 13H) may be configured to include a metal different from a metal of the first conductive layer 300A, and thus, a groove may not be formed in one surface of the first conductive layer 300A. In the former case, it is unproblematic that the first conductive layer 300A and the ultrathin metal layer (3 of FIGS. 13A to 13H) include the same metal. In the latter case, the first conductive layer 300A and the ultrathin metal layer (FIG. 13A) 3) of FIG. 13H include different metals, and thus, the first conductive layer 300A is not removed in a process of removing the ultrathin metal layer 3.

In the present embodiment, surface roughness of an interface between the first conductive layer 300A and the second conductive layer 300B may be substantially the same as surface roughness of an interface between the first surface of the support portion 200 and a second insulating layer 520. This is because in the former case among the above-described examples, even when the third conductive layer 300C is formed using a plating resist (an insulating wall 20 of FIG. 13K) for forming the third conductive layer 300C and an insulating wall 20 is then removed and an exposed ultrathin metal layer (3 of FIGS. 13A to 13H) is then removed, a portion of an ultrathin metal layer (the second conductive layer 300B) may remain in contact with the first conductive layer 300A, and thus, surface roughness obtained by transferring the surface roughness of the ultrathin metal layer may remain on the one surface of the first conductive layer 300A. This is also because in the latter case among the above-described example, even when an ultrathin metal layer (3 of FIGS. 13A to 13H) is completely removed from the first surface of the support portion 200, an etchant for removing the ultrathin metal layer does not react with the first conductive layer 300A because the ultrathin metal layer and the first conductive layer 300A include different metals, and thus, surface roughness of the one surface of the first conductive layer obtained by transferring the surface roughness of the other surface of the ultrathin metal layer is maintained.

In the case of the present embodiment, as described above, a groove described in the first embodiment is not formed in the one surface of the first conductive layer 300A. Therefore, each of the second and third conductive layers 300B and 300C may be formed to protrude from the first surface of the support portion 200 (an upper surface of the support portion 200 based on the directions of FIGS. 7 to 9). Accordingly, unlike in the first embodiment, the third conductive layer 300C may not have a first region filling a groove formed in the one surface of the first conductive layer 300A. As a result, a line width d6 of the third conductive layer 300C may be substantially the same as a line width d5 of the first conductive layer 300A.

Figure 10:
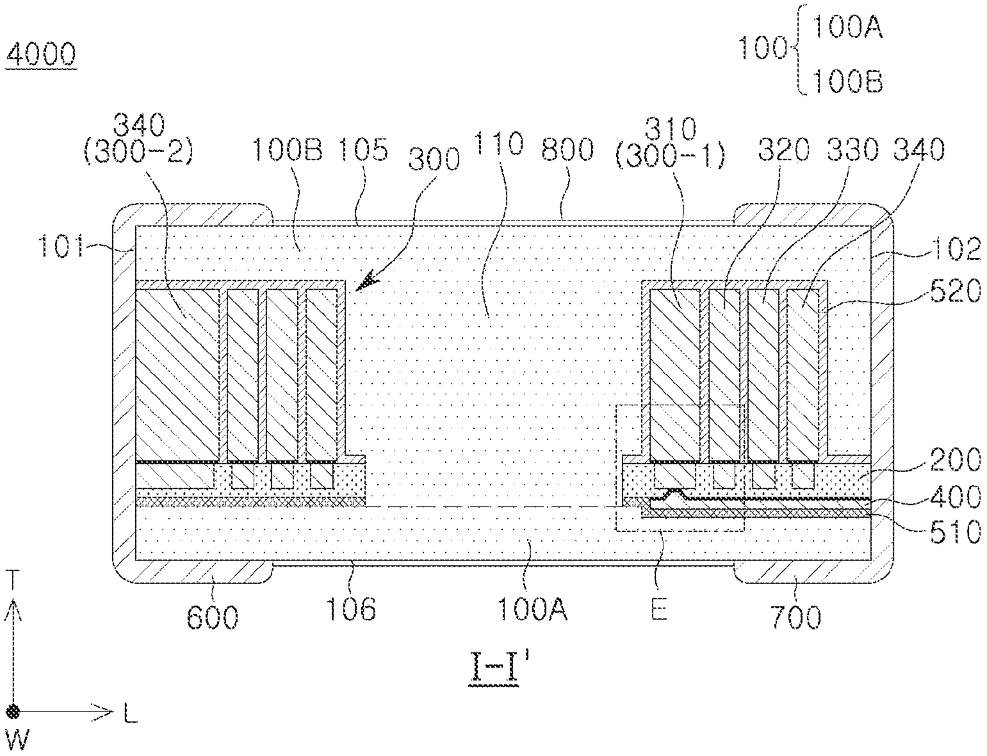
FIG. 10 is a schematic perspective view of a coil component according to a fourth exemplary embodiment of the present disclosure, and corresponds to FIG. 2.
Figure 11:
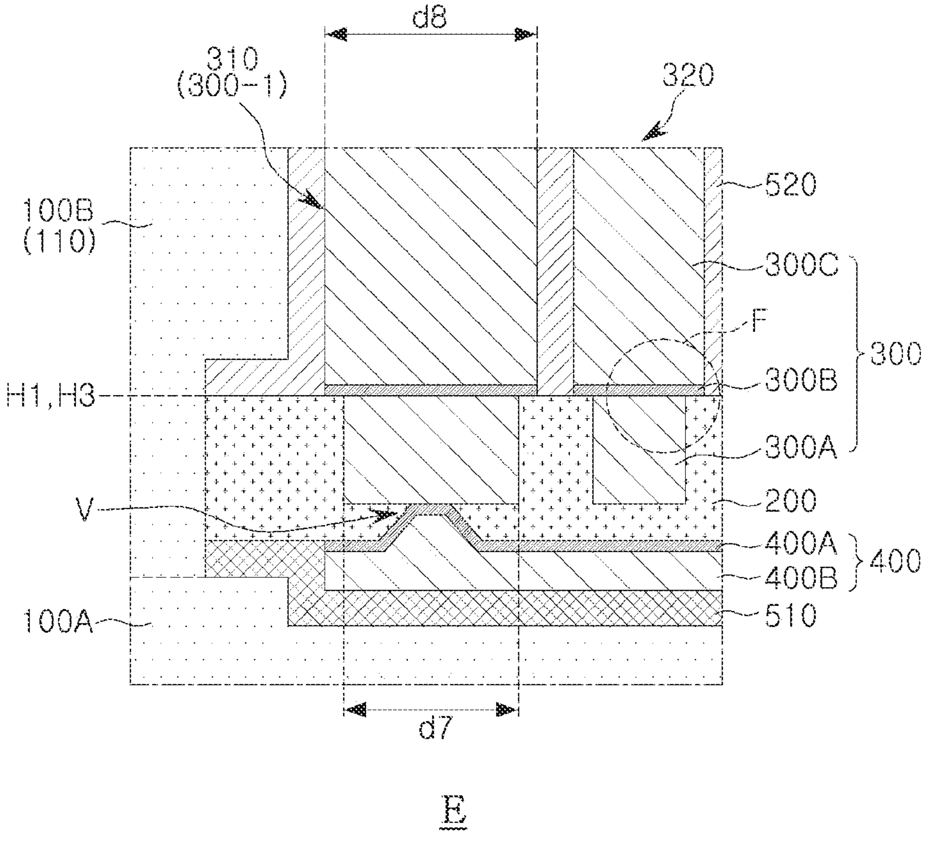
FIG. 11 is an enlarged view of portion 'E' of FIG. 10.
Figure 12:
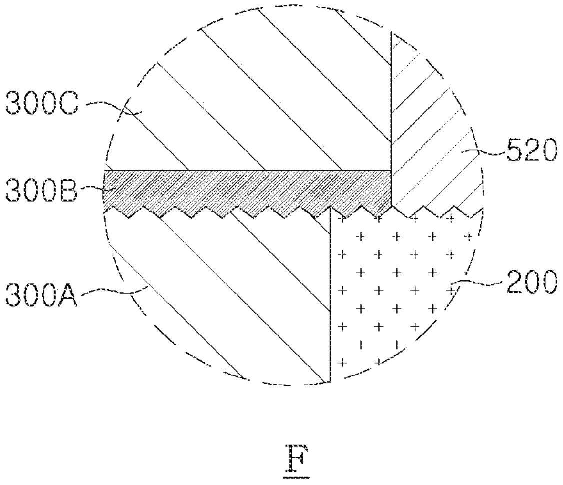
FIG. 12 is an enlarged view of portion 'F' of FIG. 11.

FIG. 10 is a schematic perspective view of a coil component according to a fourth exemplary embodiment of the present disclosure, and corresponds to FIG. 2. FIG. 11 is an enlarged view of portion 'E' of FIG. 10, and FIG. 12 is an enlarged view of portion 'F' of FIG. 11.

Referring to FIGS. 7 to 9 and FIGS. 10 to 12, a difference between a coil component 4000 according to a fourth embodiment and the coil component 3000 according to the third embodiment lies in a second conductive layer 300B. Therefore, the fourth embodiment will be described while focusing on only the second conductive layer 300B, and the description of the third embodiment may be equivalently applied to the other configurations of the fourth embodiment. In addition, the modified examples, described in the third embodiment, may be equivalently applied to the fourth embodiment.

Referring to FIGS. 7 to 9 and FIGS. 10 to 12, in the coil component 4000, at least a portion of the second conductive layer 300B may extend to be in contact with the first surface of the support portion 200, and a line width d8 of a third conductive layer 300C may be greater than a line width d7 of a first conductive layer 300A.

The coil component 4000 according to the present embodiment may be implemented by forming the third conductive layer 300C by electroplating in such a manner that both end portions of an opening of an insulating wall (20 of FIG. 13K) expose both ends of the first conductive layer 300A in a line width direction (the length direction L of each of FIGS. 5 and 6).

In the coil component 4000, the line width d8 of the second conductive layer 300C may be greater than the line width d7 of the first conductive layer 300A, so that an opening of plating resist (20 of FIG. 13K) for forming a conductive layer may be formed to be relatively large. Thus, reliability of connection between the first conductive layer 300A and the third conductive layer 300C may be secured. For example, even when a misalignment occurs between openings of the first conductive layer 300A and the plating resist (20 of FIG. 13K) for forming the third conductive layer 300C due to a process error, or the like, reliability of connection between the first conductive layer 300A and the third conductive layer 300C may be secured.

As described above, according to exemplary embodiments, a thickness of a coil component may be reduced.

While exemplary embodiments have been shown and described above, it will be apparent to those skilled in the art that modifications and variations could be made without departing from the scope of the present disclosure as defined by the appended claims.

What is claimed is:

1. A coil component comprising:
a body;
a support portion disposed in the body;
a coil portion having at least one turn disposed on a first surface of the support portion;
a lead portion disposed on a second surface of the support portion facing the first surface of the support portion and connected to the coil portion; and
a via penetrating through the support portion to connect an inner end portion of the coil portion and an inner end portion of the lead portion to each other,
wherein the coil portion comprises a first conductive layer embedded in the support portion and having a first surface exposed to or facing the first surface of the support portion, a second conductive layer disposed on the first surface of the first conductive layer, and a third conductive layer disposed on the second conductive layer and protruding from the first surface of the support portion,
the first surface of the first conductive layer is disposed on a level lower than a level of the first surface of the support portion, and
the second conductive layer is in contact with the first surface of the first conductive layer and has at least a portion disposed on a level lower than a level of the first surface of the support portion.

2. The coil component of claim 1, further comprising:

a first insulating layer disposed on the second surface of the support portion to cover the lead portion; and a second insulating layer disposed on the first of the support portion and covering the coil portion.

3. The coil component of claim 2, wherein at least a portion of a side surface of the second conductive layer is in contact with the second insulating layer.

4. The coil component of claim 3, wherein the third conductive layer comprises:

a first region disposed on a level lower than the level of the first surface of the support portion; and a second region disposed on a level higher than the level of the first surface of the support portion and having a line width greater than a line width of the first region.

5. The coil component of claim 4, wherein the line width of the second region of the third conductive layer is substantially the same as a line width of the first conductive layer.

6. The coil component of claim 4, wherein the line width of the second region of the third conductive layer is greater than a line width of the first conductive layer.

7. The coil component of claim 3, wherein the first surface of the first conductive layer is disposed on substantially the same level as the first surface of the support portion, and the second conductive layer is in contact with the first surface of the first conductive layer to be disposed above the first surface of the support portion.

8. The coil component of claim 7, wherein surface roughness of an interface between the first conductive layer and the second conductive layer is substantially the same as surface roughness of an interface between the first surface of the support portion and the second insulating layer.

9. The coil component of claim 7, wherein a line width of the third conductive layer is substantially the same as a line width of the first conductive layer.

10. The coil component of claim 7, wherein the second conductive layer extends outwardly from the first surface of the first conductive layer to be disposed onto the first surface of the support portion.

11. The coil component of claim 10, wherein a line width of the third conductive layer is greater than a line width of the first conductive layer.

12. The coil component of claim 11, wherein surface roughness of an interface between the first conductive layer and the second conductive layer, surface roughness of an interface between the first surface of the support portion and the second conductive layer, and surface roughness of an interface between the first surface of the support portion and the second insulating layer are substantially the same as one another.

13. The coil component of claim 2, wherein each of the lead portion and the via comprises a first metal layer, disposed to be in contact with the support portion, and a second metal layer disposed on the first metal layer, and at least a portion of a side surface of the first metal layer of the lead portion is in contact with the first insulating layer.

14. The coil component of claim 13, wherein the first metal layer of the lead portion and the first metal layer of the via are formed to be integrated with each other.

15. The coil component of claim 2, wherein a region of the body disposed on the first insulating layer and a region of the body disposed on the second insulating layer have a boundary therebetween.

16. The coil component of claim 1, further comprising:

a first external electrode disposed on a first end surface of the body to be in contact with an external end portion of the coil portion exposed to the first end surface of the body; and a second external electrode disposed on a second end surface of the body, opposing the first end surface of the body, to be in contact with an external end portion of the lead portion exposed to the second end surface of the body.

17. A coil component comprising:

a body;

a support portion disposed in the body;

a coil portion having at least one turn disposed on a first surface of the support portion;

a lead portion disposed on a second surface of the support portion facing the first surface of the support portion and connected to the coil portion; and a via penetrating through the support portion to connect an inner end portion of the coil portion and an inner end portion of the lead portion to each other, wherein the coil portion comprises a first conductive layer embedded in the support portion, a second conductive layer disposed on the first conductive layer, and a third conductive layer disposed on the second conductive layer, the second conductive layer includes a metal different from a metal of at least one of the first conductive layer or the third conductive layer, and at least a portion of the second conductive layer protrudes from the first surface of the support portion.

18. The coil component of claim 17, wherein at least a portion of the second conductive layer includes a recessed portion such that the at least a portion of the second conductive layer is embedded in the support portion.

19. A coil component comprising:

a body;

a support portion disposed in the body;

a coil portion having at least one turn disposed on a first surface of the support portion and winding around a core of the body penetrating the coil portion and the support portion, the coil portion including an external end portion extending to be exposed to a first end surface of the body; and a lead portion disposed on a second surface of the support portion facing the first surface of the support portion, connected to the coil portion by a via penetrating through the support portion, and extending to be exposed to a second end surface of the body opposing the first end surface of the body, wherein the first surface of the support portion has a groove, the coil portion comprises a first conductive layer disposed on the groove of the support portion, a second conductive layer disposed on the first conductive layer, and a third conductive layer disposed on the second conductive layer, and an entire space below a first region of the support portion is free of the lead portion and the lead portion is disposed on a second region of the support portion, where the first region of the support portion is located between the core and the first end surface of the body and the second region of the support portion is located between the core and the second end surface of the body.

20. The coil component of claim 19, wherein at least a portion of the second conductive layer includes a recessed portion such that the at least a portion of the second conductive layer is embedded in the support portion.

21. The coil component of claim 19, wherein at least a portion of the second conductive layer protrudes from the first surface of the support portion.

22. The coil component of claim 19, wherein a maximum line width of the second conductive layer is substantially the same as a line width of the first conductive layer.

23. The coil component of claim 19, wherein a maximum line width of the second conductive layer is greater than a line width of the first conductive layer.

24. The coil component of claim 19, wherein the third conductive layer comprises:

a first region disposed on a level lower than a level of the first surface of the support portion; and a second region disposed on a level higher than the level of the first surface of the support portion and having a line width greater than a line width of the first region of the third conductive layer.

25. The coil component of claim 24, wherein the line width of the second region of the third conductive layer is substantially the same as a line width of the first conductive layer.

26. The coil component of claim 24, wherein the line width of the second region of the third conductive layer is greater than a line width of the first conductive layer.

27. The coil component of claim 26, wherein the line width of the first conductive layer is greater than the line width of the first region of the third conductive layer.

28. The coil component of claim 19, further comprising:

a first external electrode disposed on the first end surface of the body and being in contact with the external end portion of the coil portion; and a second external electrode disposed on the second end surface of the body and being in contact with an exposed portion of the lead portion.

* * * * *